US009686012B2

(12) United States Patent
Inoue

(10) Patent No.: US 9,686,012 B2
(45) Date of Patent: Jun. 20, 2017

(54) LED-LAMP, POWER-LINE NETWORK SYSTEM, WRITING METHOD FOR LOCATION INFORMATION, PROJECTOR, DATA PROCESSING METHOD AND COLLISION AVOIDANCE SYSTEM

(71) Applicant: Renesas Electronics Corporation, Kanagawa (JP)

(72) Inventor: Satoshi Inoue, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 14/527,161

(22) Filed: Oct. 29, 2014

(65) Prior Publication Data
US 2015/0132006 A1 May 14, 2015

(30) Foreign Application Priority Data

Nov. 14, 2013 (JP) .................................. 2013-235657
Aug. 1, 2014 (JP) .................................. 2014-157374

(51) Int. Cl.
*H04B 10/116* (2013.01)
*F21V 23/00* (2015.01)
(Continued)

(52) U.S. Cl.
CPC .............. *H04B 10/116* (2013.01); *F21K 9/20* (2016.08); *F21V 23/009* (2013.01);
(Continued)

(58) Field of Classification Search
CPC ........................................ H04B 10/11–10/116
(Continued)

(56) References Cited

U.S. PATENT DOCUMENTS 8,422,889 B2 * 4/2013 Jonsson .............. H04L 12/2827
398/133
8,520,065 B2 * 8/2013 Staats ................... G01S 5/0009
348/61
(Continued)

FOREIGN PATENT DOCUMENTS

CN 202602631 12/2012
JP 2007-274566 10/2007
(Continued)

OTHER PUBLICATIONS

Extended search report dated Apr. 7, 2015 issued in European counterpart application (No. 14192612.1).
(Continued)

*Primary Examiner* — Li Liu
(74) *Attorney, Agent, or Firm* — Womble Carlyle

(57) ABSTRACT

An LED lamp acquires its location information from the outside through its power-line communication section and stores the acquired location information in nonvolatile storage device. A communication control section, which establishes visible light communication, uses visible light to transmit, at a predetermined timing, the location information read from a location information storage area in the nonvolatile storage device. An employed writing method for location information includes the steps of causing a server device coupled to a power-line network to provide a database in which the ID the LED lamp is associated with the location information, causing the server device to receive a location information write request transmitted from the LED lamp, searching the database to retrieve the location information associated with the requesting LED lamp, transmitting the retrieved location information to the power-line network, and causing the requesting LED lamp to write the location information into the nonvolatile storage method.

2 Claims, 31 Drawing Sheets

(51) Int. Cl.

| | | |
|---|---|---|
| *F21V 23/02* | (2006.01) | |
| *H05B 33/08* | (2006.01) | |
| *G03B 21/00* | (2006.01) | |
| *G03B 21/20* | (2006.01) | |
| *H04B 3/54* | (2006.01) | |
| *H04B 10/80* | (2013.01) | |
| *H05B 37/02* | (2006.01) | |
| *F21K 9/20* | (2016.01) | |
| *F21Y 115/10* | (2016.01) | |

(52) U.S. Cl.
CPC .......... *F21V 23/023* (2013.01); *G03B 21/006* (2013.01); *G03B 21/2033* (2013.01); *H04B 3/54* (2013.01); *H04B 10/80* (2013.01); *H05B 33/0842* (2013.01); *H05B 37/0263* (2013.01); *F21Y 2115/10* (2016.08)

(58) Field of Classification Search
USPC .......................................... 398/118–131, 172
See application file for complete search history.

(56) References Cited

U.S. PATENT DOCUMENTS

| | | | | |
|---|---|---|---|---|
| 8,660,436 B2* | 2/2014 | Schenk | ............. | H05B 37/0272 315/294 |
| 8,953,647 B1* | 2/2015 | Mead | ................. | H01S 3/06754 12/94 |
| 2003/0025845 A1* | 2/2003 | Murakami | ......... | G02B 27/1046 349/5 |
| 2006/0056855 A1* | 3/2006 | Nakagawa | ................ | G09F 9/33 398/183 |
| 2007/0103644 A1* | 5/2007 | Nakamura | ............. | G02B 13/22 353/31 |
| 2007/0228262 A1* | 10/2007 | Cantin | .................... | G01P 13/00 250/221 |
| 2007/0275750 A1* | 11/2007 | Nakagawa | ................ | G01S 1/70 455/550.1 |
| 2008/0281515 A1* | 11/2008 | Ann | ....................... | G01C 21/20 701/434 |
| 2009/0157309 A1* | 6/2009 | Won | ....................... | G01C 21/20 701/533 |
| 2010/0106306 A1* | 4/2010 | Simon | ................ | H05B 33/0803 700/276 |
| 2010/0111538 A1* | 5/2010 | Arita | ........................ | H04B 3/54 398/130 |
| 2011/0105134 A1 | 5/2011 | Kim et al. | | |
| 2012/0001567 A1* | 1/2012 | Knapp | .................. | H04L 12/282 315/291 |
| 2012/0086345 A1* | 4/2012 | Tran | .................... | H05B 37/0272 315/158 |
| 2012/0230696 A1* | 9/2012 | Pederson | ............ | G07C 9/00158 398/115 |
| 2013/0314711 A1* | 11/2013 | Cantin | ..................... | G01S 17/10 356/445 |
| 2013/0330088 A1* | 12/2013 | Oshima | .................. | H04B 10/11 398/130 |
| 2014/0132390 A1* | 5/2014 | Loveland | ........... | H05B 37/0227 340/5.8 |
| 2014/0186052 A1* | 7/2014 | Oshima | .............. | H04B 10/1143 398/130 |
| 2014/0268769 A1* | 9/2014 | Tran | ....................... | F21V 29/006 362/249.02 |
| 2014/0346972 A1* | 11/2014 | Tran | .................... | H05B 37/0272 315/307 |
| 2015/0147067 A1* | 5/2015 | Ryan | .................... | H04B 10/116 398/118 |

FOREIGN PATENT DOCUMENTS

| | | |
|---|---|---|
| JP | 2011-124798 | 6/2011 |
| JP | 2012-191498 | 10/2012 |
| WO | WO 2013/045189 | 4/2013 |

OTHER PUBLICATIONS

Komine et al "Integrated System of White LED Visible-Light Communication and Power-Line Communication" *IEEE Transactions on Consumer Electronics* (2003) vol. 49, No. 1 pp. 71-79.

\* cited by examiner

FIG.14

| LIGHT NUMBER | MANUFACTURER ID | PRODUCT SERIAL NUMBER | LATITUDE | LONGITUDE | HEIGHT |
|---|---|---|---|---|---|
| A001 | 0008 | 31246505 | 35/39/26.15 | 139/44/30.87 | 2 |
| A002 | 0008 | 31246506 | 35/39/25.95 | 139/44/30.20 | 2 |
| A003 | 0008 | 31246507 | 35/39/25.45 | 139/44/30.10 | 2 |
| A004 | 0008 | 31246508 | 35/39/25.11 | 139/44/29.83 | 2 |
| ... | ... | ... | ... | ... | ... |

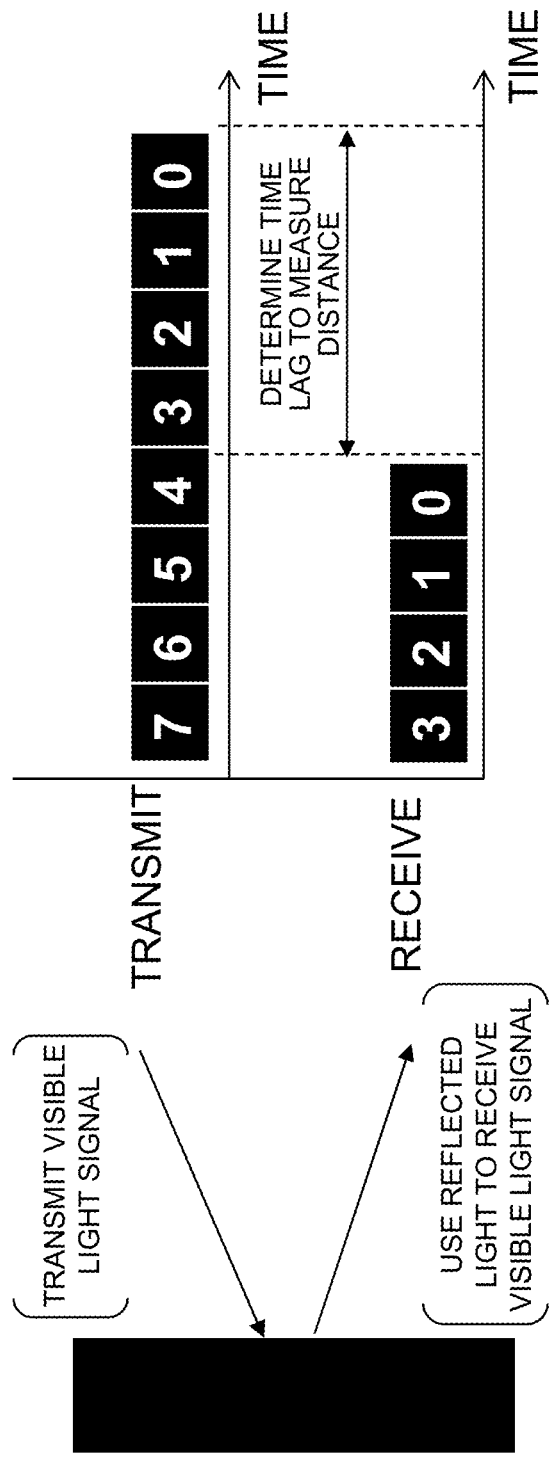

LED-LAMP, POWER-LINE NETWORK SYSTEM, WRITING METHOD FOR LOCATION INFORMATION, PROJECTOR, DATA PROCESSING METHOD AND COLLISION AVOIDANCE SYSTEM

CROSS-REFERENCE TO RELATED APPLICATIONS

The present application claims priority from Japanese Patent Application JP 2013-235657 filed on Nov. 14, 2013, and Japanese Patent Application JP 2014-157374 filed on Aug. 1, 2014, the contents of which are hereby incorporated herein by reference into this application.

BACKGROUND

The present invention relates to an LED (light-emitting diode) lamp capable of establishing visible light communication based on the illumination light of an LED, a power-line network system using such an LED lamp, an LED lamp usage in a power-line network system, and other applications of a visible light communication function of the LED lamp.

A communication function can be added to LED applications by incorporating the visible light communication function into an LED lighting device such as a straight tube type or light bulb type LED lamp. Such visible light communication based on LED light is described, for instance, in Japanese patent laid-open No. 2007-274566, Japanese patent laid-open No. 2012-191498, and Japanese patent laid-open No. 2011-124798. Japanese patent laid-open No. 2007-274566 states that the data to be transmitted (outgoing data) is received through a power line, temporarily stored, and then transmitted by using LED light. Japanese patent laid-open No. 2012-191498 states that the outgoing data is superimposed over visible light from an LED lamp and then transmitted, and that the outgoing data to be stored into a buffer memory is distributed from a server. Japanese patent laid-open No. 2011-124798 states that the data received through a local area network is transmitted by using LED light.

SUMMARY

The use of a network system that transmits location information and other specific information from various spots makes it possible to easily identify a current location. It is therefore expected that new applications of such a network system will be developed. Besides, the social need for the use of such a network system will probably increase. In view of the fact that LED lighting devices (LED lamps) compliant, for example, with the standard for a visible light beacon system (JEITA CP-1223, May 2013, http://www.jeita.or.jp/Japanese/standard/book/CP-1223), which is a standard specification for visible light communication, are being developed, the inventors of the present invention have found an advantage of using, for example, a location information transmission function by incorporating it into an LED lamp. A transmission method to be employed is, for example, a method of determining a data value in accordance with the number of bright/dark slots of logically inverted four-valued pulse position modulation (4 PPM), which is preferred for the use of an LED lamp. Studies conducted by the inventors of the present invention have revealed that when the location information transmission function is to be incorporated into an LED lamp, widespread use of such an LED lamp largely depends on whether the location information can be easily set in the LED lamp at a low cost and whether a usage pattern for providing increased convenience can be proposed. If, for instance, a communication interface is used at the time of system introduction for coupling to a personal computer and individual lighting devices and then location information is written and stored in a location information storage section, it is troublesome. Further, even if information about predetermined LED lighting device installation locations is written at the time of lighting device manufacture, and after completion of shipment, the LED lighting devices are installed at an installation site and precisely positioned at the predetermined locations, poor efficiency results and changing the information requires a great deal of labor and time. These aspects are not described in the above-mentioned patent documents.

The above and other problems to be addressed and novel features of the present invention will become apparent from the following description of the present invention and from the accompanying drawings.

The following is a brief description of a representative aspect of the present invention disclosed in this document.

An LED lamp acquires location information and other specific information about the LED lamp through its power-line communication section, stores the acquired information in its nonvolatile storage device, and causes a communication control section, which provides visible light communication, to read the specific information from the nonvolatile storage device and transmit the specific information at a predetermined timing by using visible light. Further, a method of writing the specific information includes the steps of causing a server device, which is coupled to a power-line network, to provide a database in which the ID of the LED lamp is associated with the specific information, causing the server device to receive a specific information write request that is transmitted from the LED lamp, searching the database to retrieve the specific information associated with the ID of the requesting LED lamp, transmitting the retrieved specific information to the power-line network, and causing the requesting LED lamp to write the specific information into the nonvolatile storage device.

The following is a brief description of an advantageous effect achievable by the representative aspect of the present invention disclosed in this document.

The function of an LED lamp to transmit location information and other specific information can be implemented with ease. When the function of transmitting specific information is incorporated into the LED lamp coupled to a power line, a power-line network can be used to distribute the specific information to the LED lamp. As the power-line network can be used, the relative location of the LED lamp can be acquired with ease by using various data such as an indoor electrical wiring diagram and a building structural drawing. Further, the location information (latitude/longitude information) about each of a plurality of LED lamps can be easily acquired by using a representative absolute location (latitude/longitude information) and a relative location. This makes it easy to build a database.

BRIEF DESCRIPTION OF THE DRAWINGS

FIG. 14 is a diagram illustrating entry information in a database that uses LED lamp location information;

FIG. 19 is a diagram depicting an operation performed when a terminal transmits information to a server device through an LED lamp or the like;

FIG. 31 is a diagram showing a method of computing an arrival delay time of a received code with respect to a transmitted code (a time lag).

DETAILED DESCRIPTION

1. Summary of the Embodiment

Figure 1:
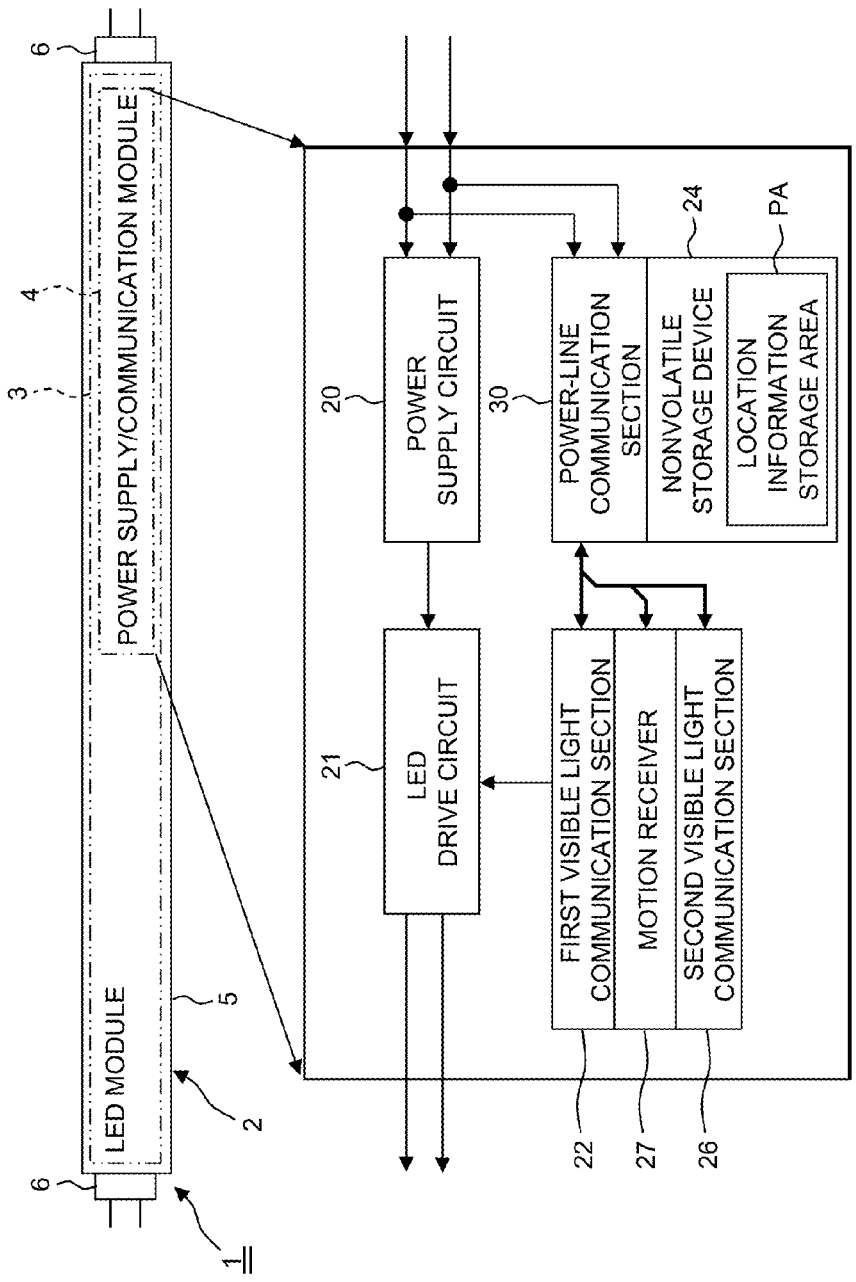
FIG. 1 is a diagram illustrating the configuration of a straight tube type LED lamp as an example of an LED lamp.

First of all, an embodiment of the present invention disclosed in this document will be summarized. Parenthesized reference numerals referred to in the summary of an embodiment correlate to reference numerals in the accompanying drawings and merely illustrate what is contained in the concept of elements to which the reference numerals are affixed.

[1] <<Transmitting Location Information by Using Visible Light Communication Based on a Lighting LED>>

According to a first aspect of the present invention, there is provided an LED lamp (1) configured so that a lighting LED (11) and a power supply/communication module (4) for the lighting LED are housed in a housing (2) having a base (6) coupled to a power line (31). The power line to which the base is coupled supplies power supply to the power supply/communication module. The power supply/communication module includes a power supply circuit (20), an LED drive circuit (21), a first communication section (22), a power-line communication section (23), and a nonvolatile storage device (24). The power supply circuit generates internal power supply by using the power supply supplied from the power line. The LED drive circuit supplies a drive voltage to the lighting LED by using the internal power supply generated by the power supply circuit. The first communication section provides control over visible light communication in a transmitting direction through the LED drive circuit. The power-line communication section establishes power-line communication through the power line. The nonvolatile storage device has a location information storage area (PA) that stores location information about a location at which the LED lamp is installed. The power-line communication section establishes the power-line communication to acquire the location information to be stored in the location information storage area. The first communication section uses visible light to transmit, at a predetermined timing, the location information read from the location information storage area.

Consequently, a location information transmission function can easily be incorporated into the LED lamp. When the location information transmission function is incorporated into the LED lamp coupled to the power line, a power-line network can be used to distribute the location information to the LED lamp. Further, the LED lamp is configured so that an LED module and a power supply/communication module are integrated into a housing. Therefore, a power supply circuit that matches the electrical characteristics of an LED element and of the LED module can be incorporated. This makes it easy to achieve high power supply efficiency, high luminance, and long life.

[2] <<Transmission Operation Based on Control of the Ratio Between LED ON Time and LED OFF Time in Accordance with Outgoing Data>>

According to a second aspect of the present invention, there is provided the LED lamp as described in the first aspect. The first communication section performs transmission to establish visible light communication by controlling the ratio between ON time and OFF time of the lighting LED in accordance with outgoing data.

Consequently, a dimming control mechanism based on pulse width control can be partly used for visible light communication. This reduces the scale of circuitry to be added for visible light communication.

[3] <<Function of Receiving a Signal from a Visible Light Sensor>>

According to a third aspect of the present invention, there is provided the LED lamp as described in the first aspect. The housing further houses a visible light sensor (70). The power supply/communication module includes a second communication section (26) that controls the reception of a signal from the visible light sensor.

Consequently, bidirectional visible light communication can be established through the first communication section and the second communication section.

[4] <<Microcomputer Sharing by the First Communication Section and the Second Communication Section>>

According to a fourth aspect of the present invention, there is provided the LED lamp as described in the third aspect. The first communication section and the second communication section share a microcomputer as a control circuit.

Consequently, the scale of circuitry of the first and second communication sections can be reduced.

[5] <<Location Information Transmission by the Power-line Communication Section>>

According to a fifth aspect of the present invention, there is provided the LED lamp as described in the third aspect. The power-line communication section transmits the location information and information received by the second communication section to the outside through the power line.

Consequently, information (for example, a terminal ID) generated by a mobile communication terminal near the LED lamp and the location information about the vicinity of the mobile communication terminal can be both transmitted to the outside through the power-line communication section. The LED lamp can be used, for instance, to confirm the location of an indoor mobile terminal.

[6] <<Function of Receiving a Signal from a Motion Sensor>>

According to a sixth aspect of the present invention, there is provided the LED lamp as described in the first aspect. The housing further houses a motion sensor (71). The power supply/communication module includes a motion receiver (27) that controls the reception of a signal from the motion sensor.

Consequently, the LED lamp can be used in an application where a motion is to be detected in the vicinity of the LED lamp.

[7] <<Microcomputer Sharing by the First Communication Section and the Motion Receiver>>

According to a seventh aspect of the present invention, there is provided the LED lamp as described in the sixth aspect. The first communication section and the motion receiver share a microcomputer as a control circuit.

Consequently, the scale of circuitry of the first communication section and of the motion receiver can be reduced.

[8] <<Location Information Transmission by the Power-line Communication Section>>

According to an eighth aspect of the present invention, there is provided the LED lamp as described in the seventh aspect. The power-line communication section transmits the location information and a motion detection result obtained by controlling the motion receiver to the outside through the power line.

Consequently, the LED lamp can be used in an application where the motion detection result obtained from the vicinity of the LED lamp and the location information about the position of such motion detection are transmitted to the outside through the power-line communication section. The LED lamp can be used, for instance, to confirm the indoor movement of a human.

[9] <<Power-line Network System>>

According to a ninth aspect of the present invention, there is provided a power-line network system including a power-line network (31N), the LED lamp (1) described in the first aspect, and a network hub (141). The LED lamp is coupled to the power-line network. The network hub acts as an interface between power-line communication through the power-line network and communication through another communication network.

Consequently, the power-line network to which the LED lamp is coupled can be used as a communication network. Therefore, when a server device is disposed in an external communication network through the network hub in order to provide centralized management of the location information to be stored in the LED lamp, the location information can be written into the LED lamp through the power-line network system. This increases the efficiency of a location information write operation (saves labor) and achieves cost reduction. There is no need to couple a write interface cable to the LED lamp on an individual basis and repeatedly perform a write operation. Further, centralized management can be provided for LED lamp maintenance by using the server device or the like.

[10] <<Transmission Operation Based on Control of the Ratio Between LED ON Time and LED OFF Time in Accordance with Outgoing Data>>

According to a tenth aspect of the present invention, there is provided the power-line network system as described in the ninth aspect. The first communication section performs transmission to establish visible light communication by controlling the ratio between ON time and OFF time of the lighting LED in accordance with outgoing data.

Consequently, a dimming control mechanism based on pulse width control can be partly used for visible light communication. This reduces the scale of circuitry to be added for visible light communication.

[11] <<Function of Receiving a Signal from a Visible Light Sensor>>

According to an eleventh aspect of the present invention, there is provided the power-line network system as described in the ninth aspect. The housing further houses a visible light sensor (70). The power supply/communication module includes a second communication section (26) that controls the reception of a signal from the visible light sensor.

Consequently, bidirectional visible light communication can be established through the first communication section and the second communication section.

[12] <<Terminal ID and Location Information Transmission by a Power-line Communication Section>>

According to a twelfth aspect of the present invention, there is provided the power-line network system as described in the eleventh aspect. Upon receipt of a terminal ID through the second communication section, the power-line communication section of the LED lamp having the second communication section transmits its own location information and the terminal ID received through the second communication section to the power-line network through the power-line communication section.

Consequently, the power-line network system can be used in an application where the terminal ID generated from a mobile communication terminal or other terminal near the LED lamp and the location information about the vicinity of the terminal are transmitted to the power-line network through the power-line communication section and transmitted further to an external communication network through the network hub. The power-line network system can be used, for instance, to confirm the location of an indoor mobile terminal.

[13] <<Function of Receiving a Signal from a Motion Sensor>>

According to a thirteenth aspect of the present invention, there is provided the power-line network system as described in the ninth aspect. The housing further houses a motion sensor (71). The power supply/communication module includes a motion receiver (27) that controls the reception of a signal from the motion sensor.

Consequently, the power-line network system can be used in an application where a motion is to be detected in the vicinity of the LED lamp.

[14] <<Location Information Transmission by the Power-line Communication Section in Response to Detection Achieved by the Motion Sensor>>

According to a fourteenth aspect of the present invention, there is provided the power-line network system as described in the thirteenth aspect. The power-line communication section transmits the location information and a motion detection result obtained by controlling the motion receiver to the power-line network.

Consequently, the power-line network system can be used in an application where the motion detection result obtained from the vicinity of the LED lamp and the location information about the position of such motion detection are transmitted to the power-line network through the power-line communication section and transmitted further to an external communication network through the network hub. The power-line network system can be used, for instance, to confirm the indoor movement of a human.

[15] <<Method of Writing Location Information into an LED Lamp>>

According to a fifteenth aspect of the present invention, there is provided a writing method for location information that is used to write location information about the LED lamp, which is described in the first aspect and coupled to a power-line network, into the LED lamp by using a server device that can be interfaced through the power-line network. The writing method for location information includes the steps of: causing the server device to acquire a database in which the ID of the LED lamp is associated with the location information (S1); causing the server device to receive a location information write request transmitted from the LED lamp coupled to the power-line network through a connector (S2); acquiring the ID of the requesting LED lamp from the location information write request received by the server device, searching the database to retrieve the associated location information by using the acquired ID, and transmitting the retrieved location information to the power-line network (S3); and causing the LED lamp having the ID of the requesting LED lamp to write the location information transmitted to the power-line network into its nonvolatile storage device (S4).

Consequently, as the power-line network is used, the relative location of the LED lamp can easily be acquired by using data such as an indoor electrical wiring diagram and a building structural drawing. Further, the location information (latitude/longitude information) about each LED lamp can also be acquired with ease by using a representative absolute location (latitude/longitude information) and the relative location. This makes it easy to build a database. Furthermore, as the LED lamp is coupled to the power-line network, the location information write request is issued. Hence, the server device transmits the associated location information to the power-line network. Upon receipt of the transmitted location information, the LED lamp writes the location information into its nonvolatile storage device. This increases the efficiency of a location information write operation. There is no need to couple a write interface cable to the LED lamp on an individual basis and repeatedly perform a write operation. The server device can be used as mentioned earlier to provide centralized management of a location information rewrite subsequent to LED lamp replacement.

[16] <<Requesting LED Lamp ID (LED Lamp's Product Number and Product Serial Number)>>

According to a sixteenth aspect of the present invention, there is provided the writing method for location information as described in the fifteenth aspect. The ID of the requesting LED lamp is formed of the LED lamp's product number and product serial number that are stored in the nonvolatile storage device.

Consequently, it is easy to avoid the assignment of duplicate IDs.

[17] <<Location Information (Latitude/Longitude Information about an LED Lamp Installation Location and Information about an LED Lamp Installation Floor)>>

According to a seventeenth aspect of the present invention, there is provided the writing method for location information as described in the sixteenth aspect. The location information includes latitude/longitude information about an LED lamp installation location and information about an LED lamp installation floor.

Consequently, it is easy to identify an indoor location at different floor levels by using the latitude/longitude information.

[18] <<Database in which the ID of a Requesting LED Lamp is Associated with Location Information>>

According to an eighteenth aspect of the present invention, there is provided the writing method for location information as described in the seventeenth aspect. Causing the server device to acquire a database includes the steps of: identifying the LED lamp installation location in a building plan view and in an electrical equipment drawing, which indicate the configuration of the power-line network; defining a reference location in the building plan view and in the electrical equipment drawing and acquiring the latitude/longitude information about the defined reference location; acquiring the latitude/longitude information about the LED lamp installation location in accordance with the acquired latitude/longitude information about the defined reference location; and generating the database in which the acquired ID of the LED lamp is associated with the location information.

Consequently, CAD data such as a building plan view and an electrical equipment drawing can be used to identify the LED lamp installation location. The latitude and longitude of each LED lamp installation location need not be directly observed. This makes it easy to generate the database.

[19] <<Transmitting Location Information by Using Visible Light Communication Based on a Lighting LED>>

According to a nineteenth aspect of the present invention, there is provided an LED lamp configured so that a lighting LED and a power supply/communication module for the lighting LED are housed in a housing having a base coupled to a power line. The power line to which the base is coupled supplies power supply to the power supply/communication module. The power supply/communication module includes a power supply circuit, an LED drive circuit, a first communication section, a power-line communication section, and a nonvolatile storage device. The power supply circuit generates internal power supply by using the power supply supplied from the power line. The LED drive circuit supplies a drive voltage to the lighting LED by using the internal power supply generated by the power supply circuit. The first communication section provides control over visible light communication in a transmitting direction through the LED drive circuit. The power-line communication section establishes power-line communication through the power line. The nonvolatile storage device has a specific information storage area that stores specific information. The power-line communication section establishes the power-line communication to acquire the specific information to be stored in the specific information storage area. The first communication section uses visible light to transmit, at a predetermined timing, the specific information read from the specific information storage area. This aspect is different from the first aspect in that the specific information is handled in place of the location information.

Consequently, a specific information transmission function can easily be incorporated into the LED lamp. When the specific information transmission function is incorporated into the LED lamp coupled to the power line, a power-line network can be used to distribute the specific information to the LED lamp.

[20] <<Power-line Network System>>

According to a twentieth aspect of the present invention, there is provided a power-line network system including a power-line network, the LED lamp described in the nineteenth aspect, and a network hub. The LED lamp is coupled to the power-line network. The network hub acts as an interface between power-line communication through the power-line network and communication through another communication network.

Consequently, the power-line network to which the LED lamp is coupled can be used as a communication network. Therefore, when a server device is disposed in an external communication network through the network hub in order to provide centralized management of the specific information to be stored in the LED lamp, the specific information can be written into the LED lamp through the power-line network system. This increases the efficiency of a specific information write operation (saves labor) and achieves cost reduction. There is no need to couple a write interface cable to the LED lamp on an individual basis and repeatedly perform a write operation. Further, centralized management can be provided for LED lamp maintenance by using the server device or the like.

[21] <<Specific Information>>

According to a twenty-first aspect of the present invention, there is provided the LED lamp as described in the nineteenth aspect. The specific information is location coordinate information for identifying the location of the LED lamp, surrounding area information related to an area surrounding the location of the LED lamp, or information irrelevant to the location of the LED lamp.

Consequently, the LED lamp can be extensively used in various applications where location information about a location within a power-line network, area information about an area surrounding the location, information about product code and price to be indicated by a shelf label, or warning information indicating, for example, the occurrence of an abnormality is transmitted as needed within the power-line network by using visible light.

[22] <<Projector>>

According to a twenty-second aspect of the present invention, there is provided a projector (200) that separates light irradiated from a light source (1A) into lights of three primary colors, namely, red, green, and blue, transmits the separated lights through transmissive liquid crystal panels (206-208), which form a transmission pattern in accordance with data, and combines the transmitted lights to generate a color image. The projector includes the LED lamp described in the nineteenth aspect as the light source.

Consequently, the light irradiated from the LED lamp includes specific information, which is superimposed over the color image. Therefore, the superimposed specific information can be acquired by receiving the light reflected from the color image projected by the projector. Further, as the specific information can be acquired by using the reflected light derived from visible light, the range of information diffusion can be more narrowly limited than when, for instance, wireless communication is used. This provides increased security.

[23] <<Giving Specific Information to the Projector Through the Power-line Network>>

According to a twenty-third aspect of the present invention, there is provided the projector as described in the twenty-second aspect. The first communication section (22) uses visible light to transmit specific information that is given from the power line (31) through the power-line communication section (23).

Consequently, specific information can be given to the projector through the power line that supplies operating power to the projector.

[24] <<Giving Specific Information Directly from a Host Device to the Projector>>

According to a twenty-fourth aspect of the present invention, there is provided the projector as described in the twenty-second aspect. The projector further includes an external interface section (221) that acts as an interface between the power line (31) to which the LED lamp is coupled and another communication line (220). The first communication section uses visible light to transmit the specific information that is given from the external interface section through the power-line communication section.

Consequently, the host device, which gives data to the projector in order to form the transmission pattern, can give specific information to the projector by transmitting it to the external interface section.

[25] <<Function of Receiving a Signal from a Visible Light Sensor>>

According to a twenty-fifth aspect of the present invention, there is provided the LED lamp as described in the nineteenth aspect. The housing further houses a visible light sensor (70). The power supply/communication module includes a second communication section (26) that controls the reception of a signal from the visible light sensor. The power-line communication section transmits the information received by the second communication section to the outside through a power line.

Consequently, bidirectional visible light communication can be established through the first communication section and the second communication section.

[26] <<Transmitting Specific Information by Using Visible Light Communication Based on a Lighting LED>>

According to a twenty-sixth aspect of the present invention, there is provided a projector (200) that separates light irradiated from a light source (1A) into lights of three primary colors, namely, red, green, and blue, transmits the separated lights through transmissive liquid crystal panels (206-208), which form a transmission pattern in accordance with data, and combines the transmitted lights to generate a color image. The light source is an LED lamp configured so that a lighting LED (11) and a power supply/communication module for the lighting LED are housed in a housing (2) having a base (6) coupled to a power line (31). The power line to which the base is coupled supplies power supply to the power supply/communication module. The power supply/communication module includes a power supply circuit (20), an LED drive circuit (21), a first communication section (22), and a power-line communication section. The power supply circuit generates internal power supply by using the power supply supplied from the power line. The LED drive circuit supplies a drive voltage to the lighting LED by using the internal power supply generated by the power supply circuit. The first communication section provides control over visible light communication in a transmitting direction through the LED drive circuit. The power-line communication section establishes power-line communication through the power line. The first communication section uses visible light to transmit specific information that is given through the power-line communication section.

Consequently, the same advantageous effect is obtained as described in the twenty-second aspect.

[27] <<Giving Specific Information to the Projector Through the Power-line Network>>

According to a twenty-seventh aspect of the present invention, there is provided the projector as described in the twenty-sixth aspect. The first communication section uses visible light to transmit the specific information that is given from the power line through the power-line communication section.

Consequently, the same advantageous effect is obtained as described in the twenty-third aspect.

[28] <<Giving Specific Information Directly from the Host Device to the Projector>>

According to a twenty-eighth aspect of the present invention, there is provided the projector as described in the twenty-sixth aspect. The projector includes an external interface section (221) that acts as an interface between the power line to which the LED lamp is coupled and another communication line (220). The first communication section uses visible light to transmit specific information that is given from the external interface section through the power-line communication section.

Consequently, the same advantageous effect is obtained as described in the twenty-fourth aspect.

[29] <<Establishing Visible Light Communication to Give Projection Image Information to a Terminal Device for Processing Purposes>>

According to a twenty-ninth aspect of the present invention, there is provided a data processing method. The data processing method includes the steps of: projecting a color image that is generated in accordance with the image data input by the projector described in the twenty-sixth aspect and in accordance with the specific information; and causing a terminal device to receive the light reflected from the projected color image and reproduce the specific information included in the reflected light.

Consequently, the data processing method is suitable for an application where visible light communication is established to give information about projected image data as needed to a terminal device for processing purposes.

[30] <<Collision Avoidance System Based on an LED Lamp>>

According to a thirtieth aspect of the present invention, there is provided a collision avoidance system. The collision avoidance system includes the LED lamp (1B) described in the nineteenth aspect, a photodetector (501), and a data processing device (502). The photodetector receives the light reflected from the front of irradiation direction when the LED lamp irradiates light to convey the specific information. The data processing device computes the time interval between the instant at which the LED lamp irradiates light to convey the specific information and the instant at which the resulting reflected light is received by the photodetector.

Consequently, when, for example, the LED lamp is used as a headlight or taillight of a vehicle, the distance to an obstacle in front of the irradiation direction can be determined in accordance with the time required for the specific information reflected from the front of irradiation direction of LED lamp light to reach a visible light sensor. This will help avoid the collision of the vehicle.

[31] <<Collision Avoidance System Based on an LED Lamp Having a Built-in Visible Light Sensor>>

According to a thirty-first aspect of the present invention, there is provided a collision avoidance system. The collision avoidance system includes an LED lamp (1C), a power line (31), and a data processing device (502), which are all mounted in a vehicle. The LED lamp is configured so that a lighting LED (11) and a power supply/communication module (4) for the lighting LED are housed in a housing (2) having a base (6) coupled to the power line. The power line to which the base is coupled supplies power supply to the power supply/communication module. The power supply/communication module includes a power supply circuit (20), an LED drive circuit (21), a first communication section (22), a power-line communication section (30), a nonvolatile storage device (24), a visible light sensor (70), and a second communication section (26). The power supply circuit generates internal power supply by using the power supply supplied from the power line. The LED drive circuit supplies a drive voltage to the lighting LED by using the internal power supply generated by the power supply circuit. The first communication section provides control over visible light communication in a transmitting direction through the LED drive circuit. The power-line communication section establishes power-line communication through the power line. The second communication section inputs a signal from the visible light sensor and provides control over visible light communication in a receiving direction. The power-line communication section establishes the power-line communication to acquire the specific information to be stored in the nonvolatile storage device. The first communication section uses visible light to transmit the specific information read from the nonvolatile storage device. The power-line communication section uses visible light to receive information under control of the second communication section and transmits the received information to the outside through the power line. The data processing device inputs the received information, which is output from the power-line communication section, and computes the time interval between the instant at which the LED lamp irradiates light to convey the specific information and the instant at which the resulting reflected light is received by the visible light sensor.

Consequently, the same advantageous effect is obtained as described in the thirtieth aspect without providing the photodetector described in the thirtieth aspect as an external circuit.

2. Further Detailed Description of the Embodiment

The embodiment of the present invention will now be described in further detail.

<<LED Lamp>>

FIG. 1 illustrates the configuration of a straight tube type LED lamp as an example of an LED lamp. The LED lamp 1 shown in FIG. 1 is configured so that an LED module 3 and a power supply/communication module 4 are housed in a tubular housing 2. The housing 2 includes a tubular portion 5 and a base portion 6. The base portion 6 covers both ends of the tubular portion 5 and is coupled to a connector (not shown). The base portion 6 includes, for example, a protruding electrode that can be coupled to a power supply terminal of the connector. The power supply terminal of the connector is coupled to a power line.

Figure 2:
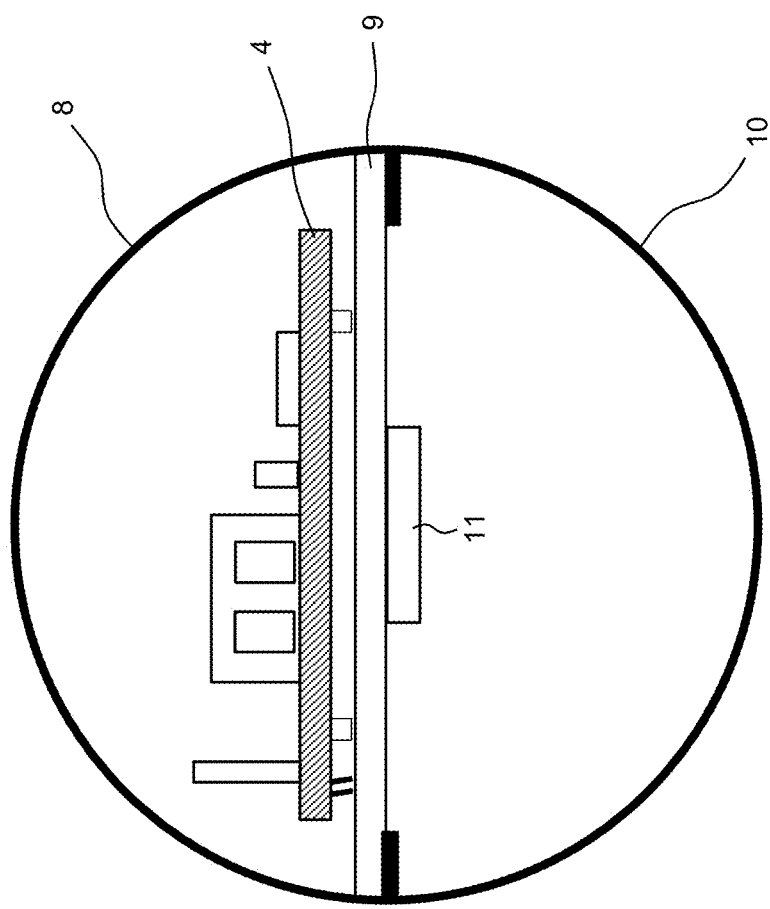
FIG. 2 is a transverse cross-sectional view of the straight tube type LED lamp shown in FIG. 1.
Figure 3:
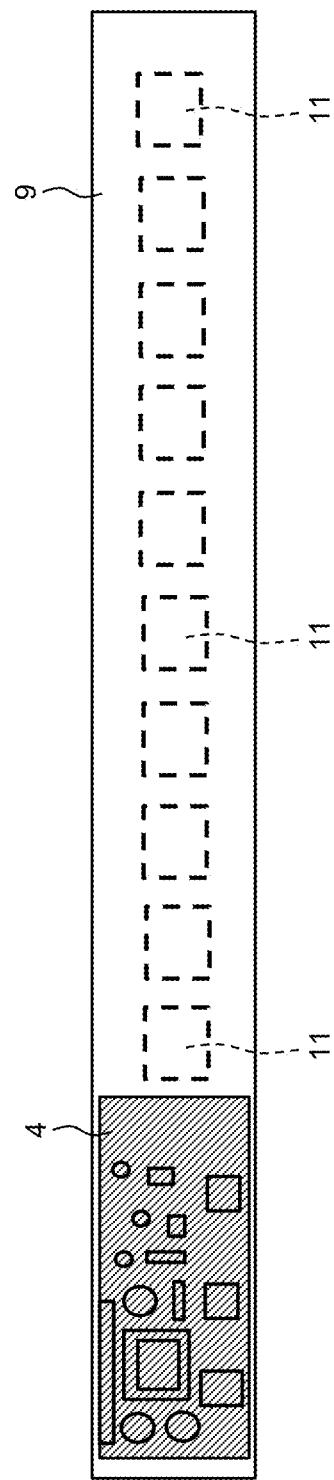
FIG. 3 is a planar view of a mounting substrate.

As illustrated in a transverse cross-sectional view of FIG. 2, the tubular portion 5 is divided into two in its axial direction. One half member 8 doubles as a heat sink made, for instance, of aluminum. Disposed in its diametral plane is a mounting substrate 9. The other half member 10 is a semi-transparent plastic cover. A power feed path over which a plurality of lighting LEDs 11 are mounted is formed over one surface of the mounting substrate 9, which faces the plastic cover. A portion in which the lighting LEDs 11 are mounted over the power feed path corresponds to the LED module 3. The power supply/communication module 4 is mounted over the opposite surface of the mounting substrate 9 and coupled to the power feed path. FIG. 3 is a planar view of the mounting substrate. The LED lamp 1 is not limited to a straight tube type and may be, for instance, a light bulb type illustrated in FIG. 4. For example, the housing 2 for the light bulb type LED lamp 1 is formed by an aluminum heat sink 8 and a hemispherical plastic cover 10. The aluminum heat sink 8 is shaped like a hollow trigonal pyramid with a base 6 disposed on its top. The mounting substrate 9 is disposed in the hollow opening in the aluminum heat sink 8. The power supply/communication module 4 is erected over the mounting substrate 9. The lighting LEDs 11 mounted over the surface of the mounting substrate 9 are covered with the plastic cover 10.

As illustrated in FIG. 1, the power supply/communication module 4 includes a power supply circuit 20, an LED drive circuit 21, a first visible light communication section 22, a power-line communication section 23, and a nonvolatile storage device 24. The first visible light communication section 22 acts as a first communication section that provides controls over visible light communication in a transmitting direction. The power supply/communication module 4 further includes a second visible light communication section 26 and a motion receiver 27. The second visible light communication section 26 acts as a second communication section that provides control over visible light communication in a receiving direction. The motion receiver 27 controls the reception of a signal from a motion sensor.

The power supply circuit 20 generates internal power supply by using the power supply supplied from the power line.

The LED drive circuit 21 supplies a drive voltage to the lighting LEDs 11 by using the internal power supply generated by the power supply circuit 20, and provides lighting control or dimming control by exercising pulse width control of the drive voltage to be supplied.

The nonvolatile storage device 24 has a location information storage area PA for storing location information about a location at which the LED lamp 1 is installed.

The power-line communication section 23 establishes bidirectional power-line communication through the power line, and exercises control to acquire its own location information by means of power-line communication and write the acquired location information into the location information storage area PA of the nonvolatile storage device 24.

The first visible light communication section 22 provides control over visible light communication in a transmitting direction through the LED drive circuit 21. The first visible light communication section 22 handles visible light having a wavelength, for instance, of 380 to 780 nm as a carrier wave, encodes the visible light by a so-called 4 PPM encoding method (including the I-4 PPM coding method) in accordance with the data to be transmitted, and provides transmission control by exercising bright/dark control of illumination light. The frame format to be employed for visible light communication complies with the standard (JEITA CP-1223, May 2013, http://www.jeita.or.jp/japanese/standard/book/CP-1223) for a visible light beacon system. A dimming control circuit can be partly used to exercise bright/dark control of illumination light by means of visible light communication. The first visible light communication section 22 uses visible light to transmit the location information, which is read from the location information storage area PA, through the LED drive circuit 21 at a predetermined timing. When a location information transmission function is incorporated into the LED lamp 1 coupled to the power line as described above, a power-line network can be used to distribute the location information to the LED lamp 1. Thus, the location information transmission function can easily be implemented with respect to a visible light transmission function of the LED lamp 1.

Figure 5:
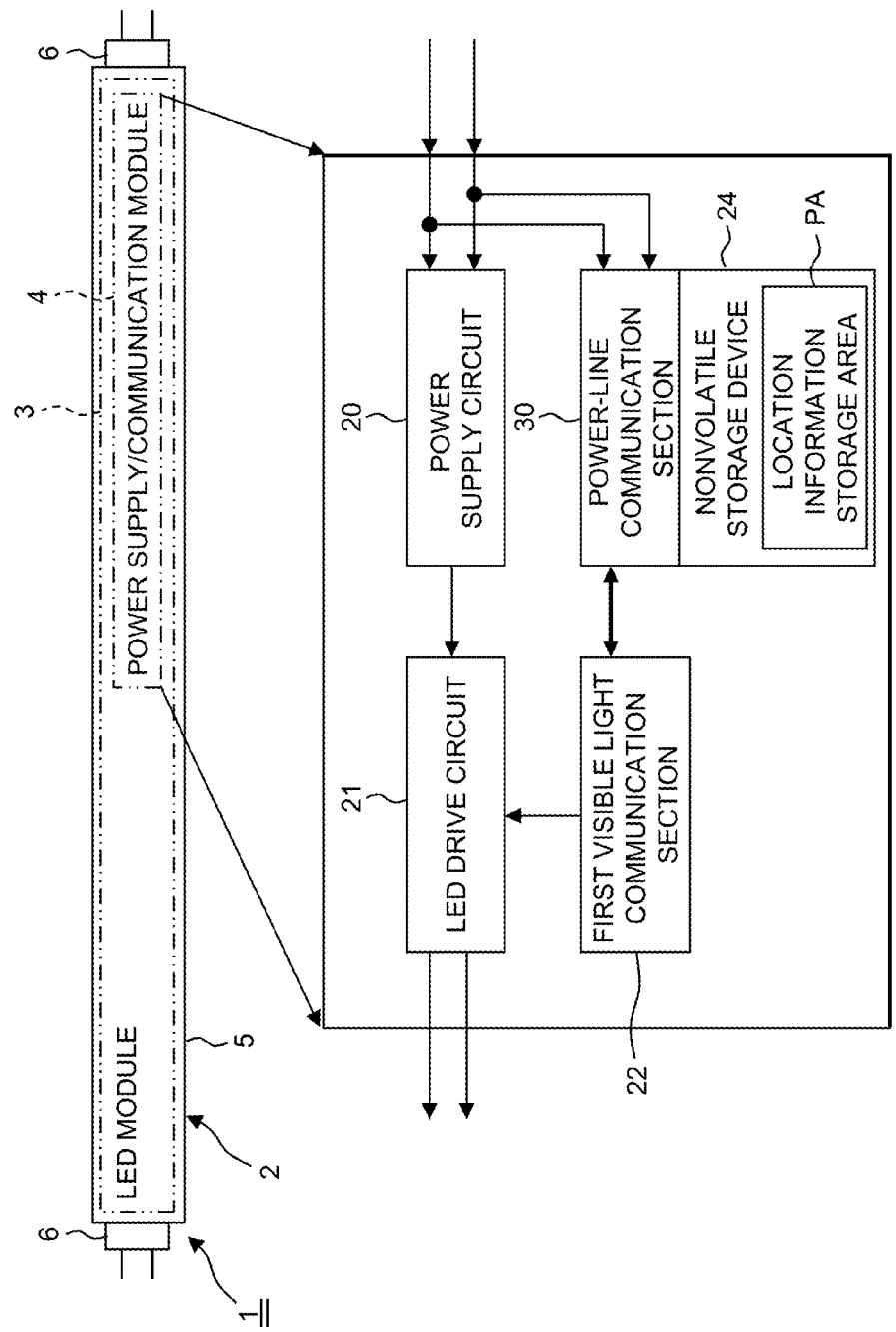
FIG. 5 is diagram showing an LED lamp from which a second visible light communication section and a motion receiver are omitted.

The second visible light communication section 26 provides control over visible light communication in a receiving direction. When such control is exercised when the first visible light communication section 22 provides transmission, bidirectional communication can be established. The motion receiver 27 is included to provide increased convenience in an application where the result of detection by the motion sensor is used. The second visible light communication section 26 and the motion receiver 27 are not essential parts and may be omitted as illustrated in FIG. 5.

Figure 4:
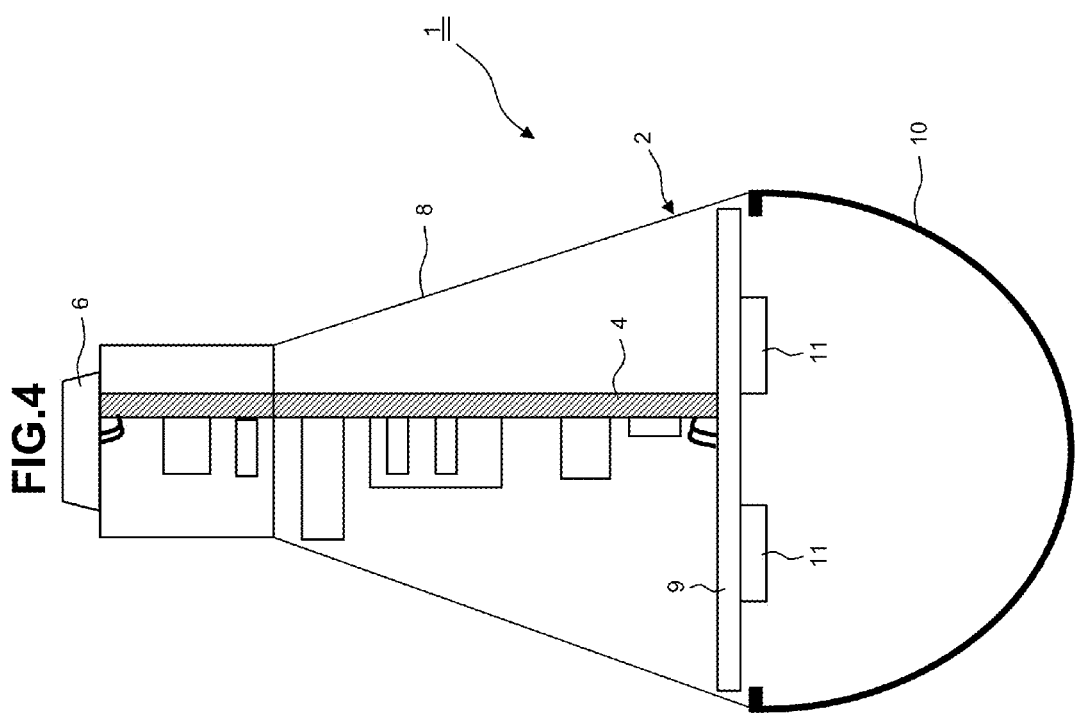
FIG. 4 is a diagram illustrating a light bulb type LED lamp.

The configuration of the power supply/communication module 4 remains unchanged no matter whether a light bulb type LED lamp shown in FIG. 4 or a straight tube type LED lamp is used.

Figure 6:
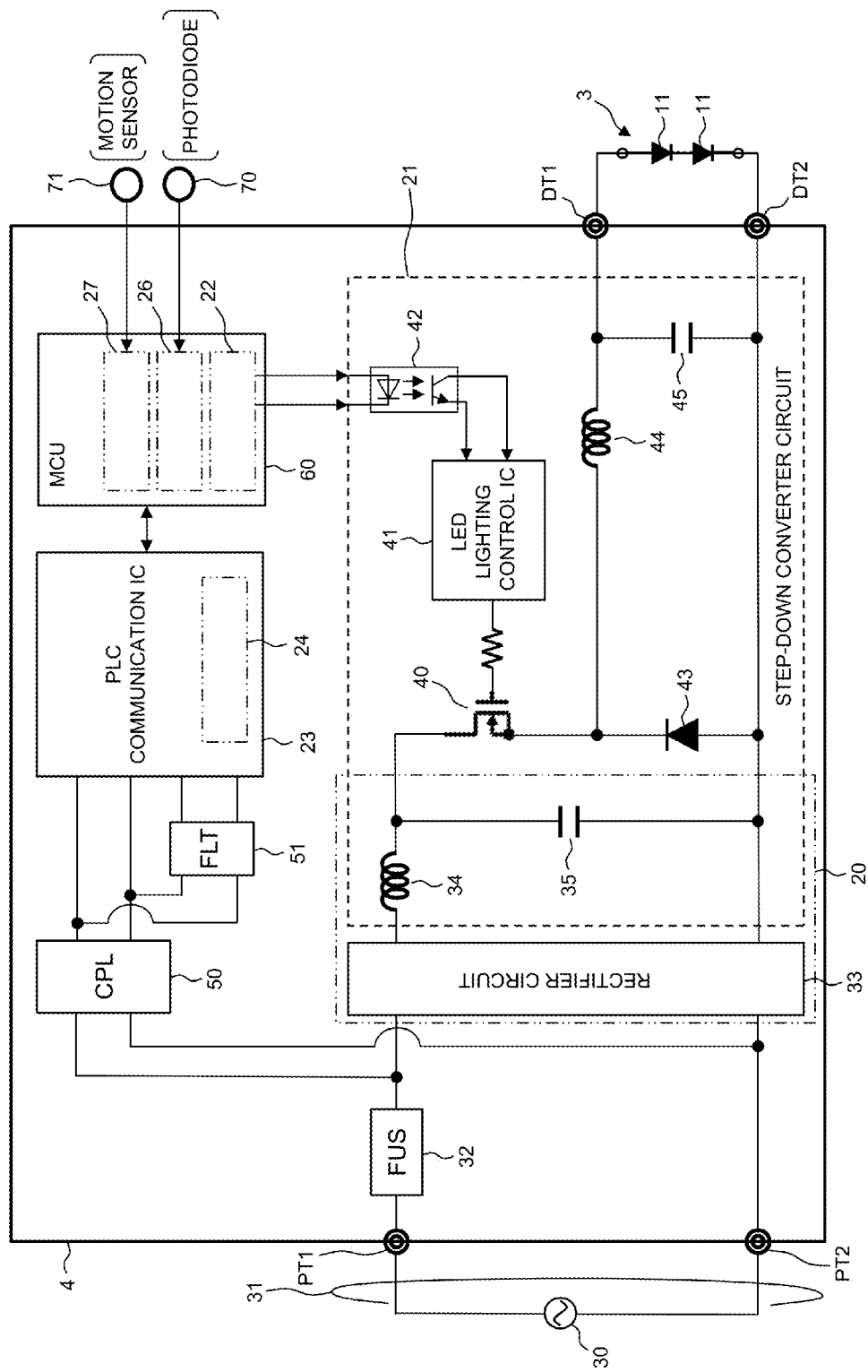
FIG. 6 is a block diagram illustrating the details of a power supply/communication module shown in FIG. 1.

FIG. 6 illustrates the details of the power supply/communication module 4 shown in FIG. 1. The power supply/communication module 4 has a power supply function for steadily supplying electrical power to illuminate the LED module 3 and a communication function for establishing power-line communication and visible light communication.

AC power 30 is supplied to power supply terminals PT1, PT2 of the power supply/communication module 4 through a power line 31. The power supply circuit 20 includes a rectifier circuit 33 and a smoothing circuit. The rectifier circuit 33 is formed of a diode bridge circuit that rectifies an AC current input through a fuse (FS) 32. The smoothing circuit smoothes an output of the rectifier circuit 33 by using a coil 34 and a capacitor 35.

The LED drive circuit 21 receives an output of the power supply circuit 20 and forms a step-down power factor corrector (PFC). The power factor corrector includes a high-side switch MOSFET 40, an LED lighting control IC 41 for providing switching control of the high-side switch MOSFET 40, a photocoupler 42 for coupling the first visible light communication section 22 to the LED lighting control IC 41, a diode 43, a coil 44, and a capacitor 45. A drive voltage generated by the power factor corrector is supplied to the LED module 3 through drive terminals DT1, DT2. The LED lighting control IC 41 outputs a constant current to the lighting LEDs 11 as it has, for example, an overcurrent detection function for detecting a coil current with an external current sensing resistor (not shown) and turning off the high-side switch MOSFET 40. The smoothing circuit and the PFC may be defined as a step-down converter circuit.

In order to be coupled to the power line to establish power-line communication, the power-line communication section 23 needs to provide insulation and shut off noise irrelevant to communication signals. Therefore, the power-line communication section 23 is coupled to the power line 31 through a coupling circuit (CPL) 50 having a transformer and a coil, and through an input filter circuit (FLT) 51.

The power-line communication section 23 is formed of a power-line communication (PLC) IC that provides power-line communication. The power-line communication section 23 may be simply referred to as the PLC communication IC 23. The nonvolatile storage device 24 is not particularly limited, but is an on-chip device attached to the PLC communication IC. The power-line communication section 23 is coupled to a microcomputer (microcontroller) 60. The microcomputer 60 exercises program control by using its hardware and software to implement the functions, for instance, of the first visible light communication section 22, of the second visible light communication section 26, and of the motion receiver 27. The first visible light communication section 22 is coupled to the photocoupler 42. The second visible light communication section 26 is coupled to a photodiode 70. Thus, the motion receiver 27, which receives data by inputting a photoelectrically converted signal in accordance with a predetermined data reception protocol, inputs a motion detection signal of the motion sensor 71.

Figure 7:
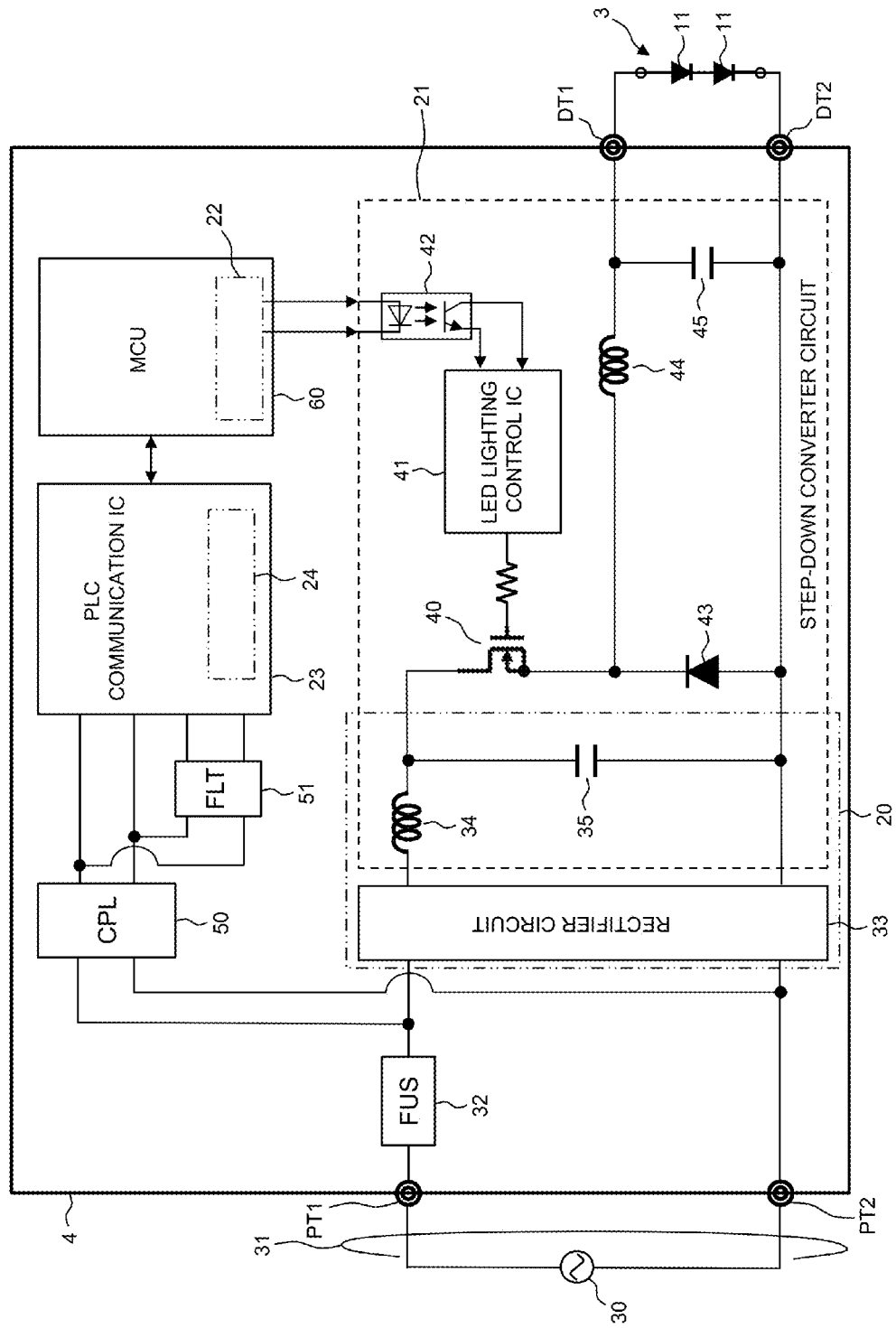
FIG. 7 is a block diagram illustrating the details of a power supply/communication module shown in FIG. 5.

FIG. 7 illustrates the details of the power supply/communication module 4 shown in FIG. 5. The power supply/communication section 4 shown in FIG. 7 differs from the one shown in FIG. 6 in that the former includes neither the second visible light communication section 26 nor the motion receiver 27.

Figure 8:
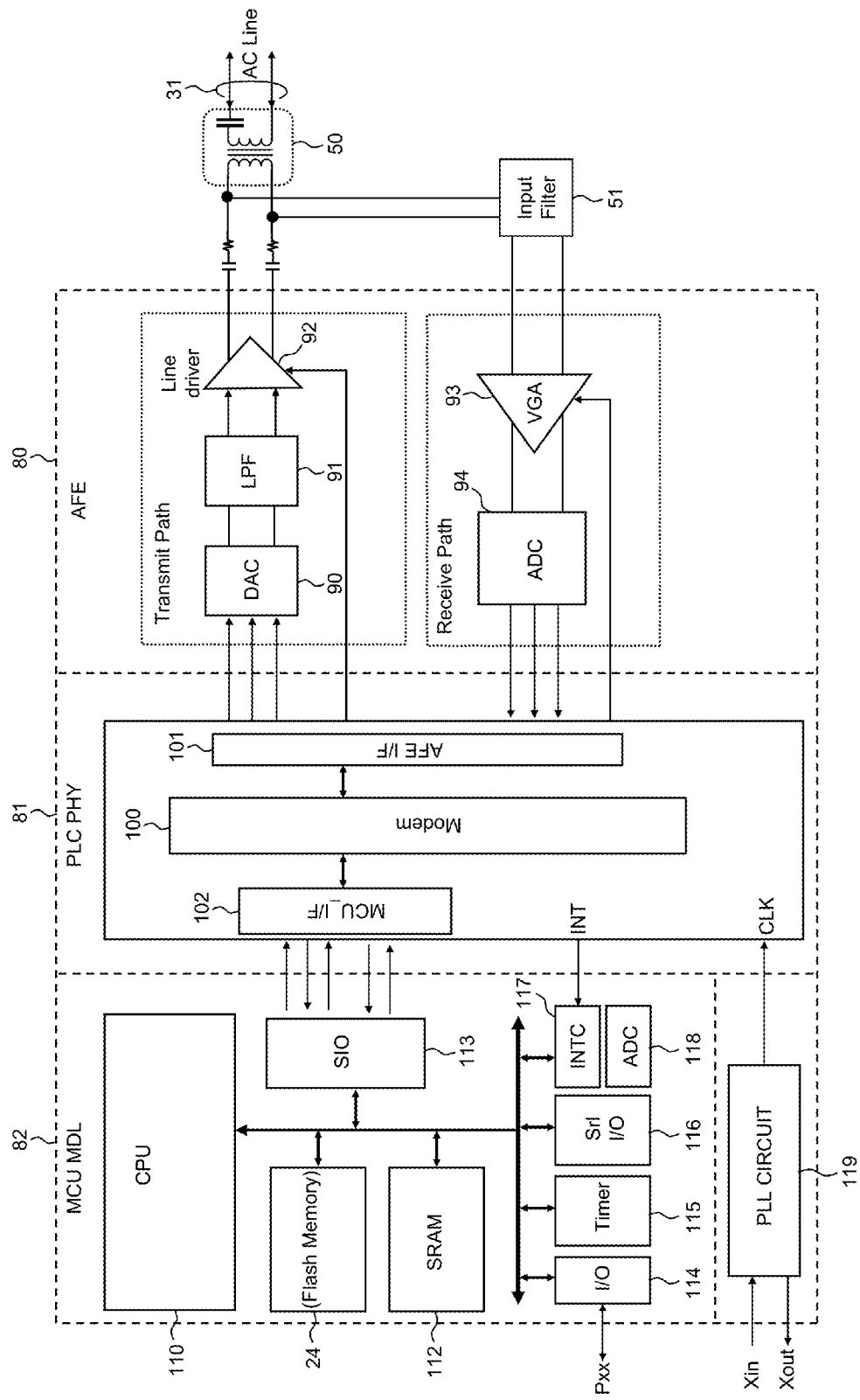
FIG. 8 is a block diagram illustrating the details of a PLC communication IC.

FIG. 8 illustrates the details of the PLC communication IC. The PLC communication IC includes an analog front end (AFE) section 80, a physical section (PLC PHY) 81, and a microcomputer (MCU MDL) 82.

The analog front end section 80 is a circuit positioned between the physical section 81 and the power line 31. The analog front end section 80 has two signal paths: a transmit path and a receive path.

The transmit path includes a digital-to-analog converter (DAC) 90 driven by a signal from the physical section 81, a low-pass filter (LPF) 91, and a differential line driver amplifier (LD) 92 for driving the power line. The output of the differential line driver amplifier 92 is coupled to the power line 31 through a coupling circuit 50.

The receive path includes a differential variable gain amplifier (VGA) 93 and an analog-to-digital converter (ADC) 94. A signal from the input filter circuit 51 coupled to the coupling circuit 50 is supplied to the differential variable gain amplifier (VGA) 93.

The physical section 81 includes a modem section 100 that implements a modem function compliant with the PLC communication specification. If the PLC communication IC uses, for example, a differential code shift keying (DCSK) turbo spread spectrum modulation method, a communication speed of up to 500 kbps can be achieved by using an existing power line. The modem section 100 is interfaced to the analog front end section 80 by an analog front end interface (AFE UF) 101 and interfaced to the microcomputer 82 through a microcomputer interface (MCU UF) 102. The microcomputer interface 102 performs, for example, serial input/output.

The microcomputer 82 includes a central processing unit (CPU) 110 for executing a program, a flash memory 24 used as a nonvolatile storage device, a SRAM 112 used, for instance, as a work area for the CPU 110, a serial interface circuit (SIO) 113 for performing serial transfer with respect to the microcomputer interface 102, an I/O port (I/O) 114 interfaced to the outside of the PLC communication IC 23, a timer 115, a serial input/output circuit (Srl I/O) 116 interfaced to the outside of the PLC communication IC 23, an interrupt controller (INTC) 117, an analog-to-digital converter circuit (ADC) 118, and a PLL circuit 119 for generating an operation reference clock signal. The nonvolatile storage device 24 has not only the location information storage area PA but also a storage area for storing the other data and programs, and is formed of an electrically rewritable flash memory. The nonvolatile storage device 24 may be simply referred to as the flash memory 24.

In accordance with a program of the CPU 110, the microcomputer 82 performs a power-line communication protocol process and exchanges data with the microcomputer 60. The microcomputer 82 writes, for example, a communication protocol program into the flash memory 24, uses the CPU 110 to perform arithmetic processing, temporarily stores data in the SRAM 112, and controls the flash memory 24, the timer 115, the SIO 113, the I/O port 114, and the like. Information about a current location and a surrounding area, LED dimming control information, maintenance information, and other required information, which are transmitted through the power line, are output from the serial I/O 116 or the I/O port 114 to the external microcontroller 60. Conversely, information input from the external microcontroller 60 through the serial I/O 116 or the I/O port 114 is transmitted to the power line 31 through the physical section 81 and the analog front end section 80.

Figure 9:
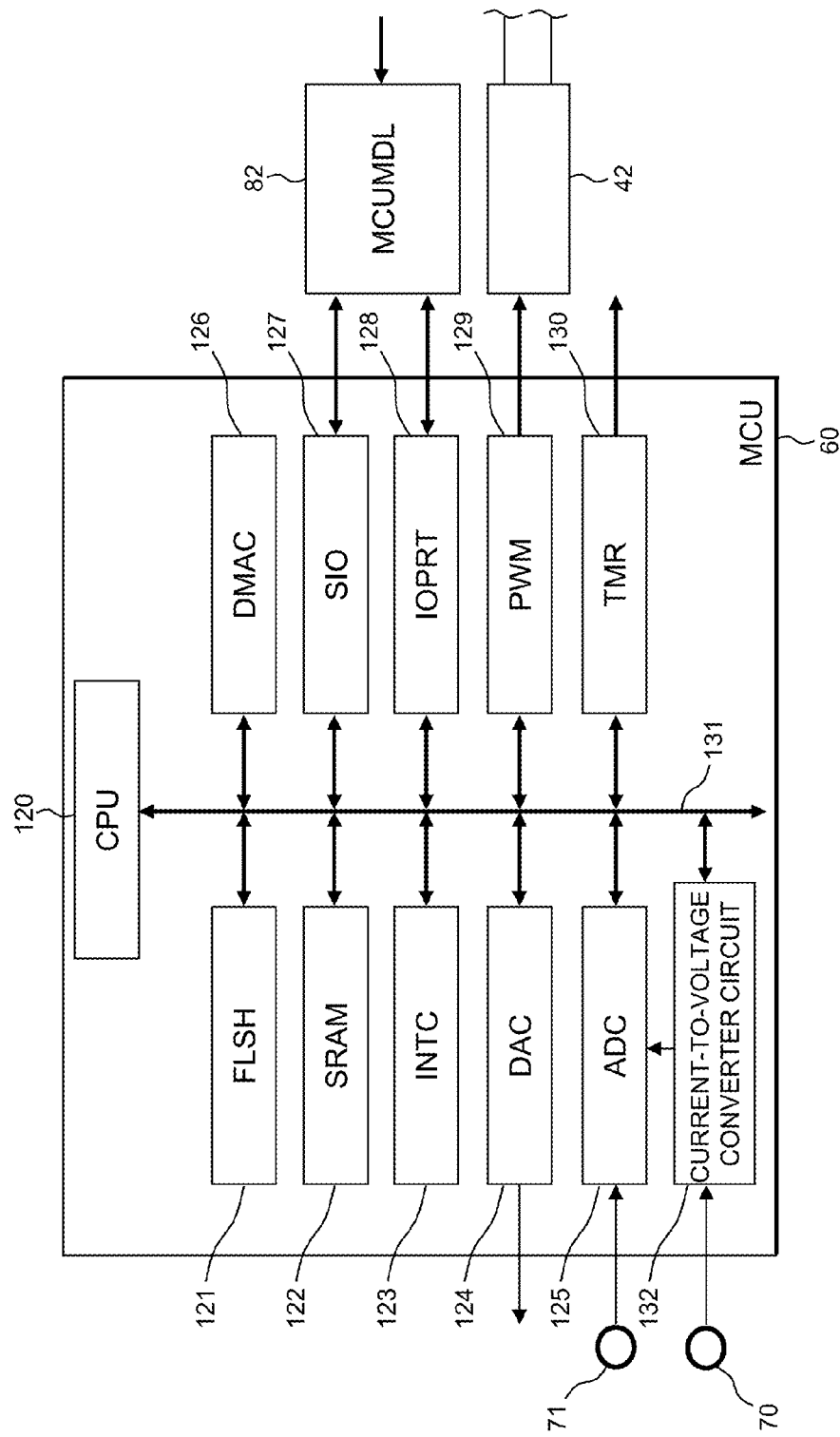
FIG. 9 is a block diagram illustrating the details of a microcomputer for visible light communication control.

FIG. 9 illustrates the details of the microcomputer 60. The microcomputer 60 is not particularly limited, but is formed of an internal bus 131, a central processing unit (CPU) 120, a flash memory 121, a SRAM 122, an interrupt controller (INTC) 123, a digital-to-analog converter circuit (DAC) 124, an analog-to-digital converter circuit (ADC) 125, a direct memory access controller (DMAC) 126, a serial input/output circuit (SIO) 127, an input/output port (IOPRT) 128, a pulse width modulation (PWM) circuit 129, a timer (TMR) 130, and a current-to-voltage converter circuit 132.

The flash memory 121 is a nonvolatile memory capable of electrically rewriting programs and data. The SRAM 122 is used, for instance, as a work area for the CPU 120. The interrupt controller 123 inputs an interrupt request signal from the inside or from the outside and gives an interrupt signal to the CPU 120. The DAC 124 converts an internally generated digital signal to an analog signal and outputs the analog signal. The ADC 125 converts an externally input analog voltage signal or a voltage signal output from the current-to-voltage converter circuit 132 to digital data. The current-to-voltage converter circuit 132 inputs a current signal flowing in the photodiode 70 and converts the input current signal to a voltage signal. A signal received by the photodiode 70 can be converted to digital data through the current-to-voltage converter circuit 132 and the ADC 125 and passed to the CPU 120 for processing. A signal output from the motion sensor 71 can be converted to digital data through the ADC 125 and passed to the CPU 120 for processing. The PWM circuit 129 generates a signal having a pulse width corresponding to control data. A pulse width modulation signal whose pulse width is regulated by the PWM circuit 129 is supplied to the photocoupler 42 so that the lighting LEDs 11 is subjected to dimming control to transmit visible light.

The CPU 120 processes data as needed while using peripheral functions in accordance with an executed program.

The microcomputer 60 implements a visible light reception function, which is to be exercised by the second visible light communication section. The current-to-voltage converter circuit 132 inputs a current signal flowing in the photodiode 70 and converts the input current signal to a voltage signal. The resulting voltage signal is rendered convertible in a first analog-to-digital conversion channel of the ADC 125. An interrupt request is issued each time an analog-to-digital conversion is completed. In response to a cause (analog-to-digital conversion in the first analog-to-digital conversion channel) of the interrupt request, the CPU 120 branches off to a photodiode reception process. For example, the CPU 120 decodes data received by the photodiode 70 in accordance with a predetermined standard and gives the decoded meaningful data to the microcomputer 82, for instance, through the serial input/output circuit 127.

The microcomputer 60 implements a dimming control function and a visible light transmission function, which is to be exercised by the first visible light communication section 22. Bright/dark control of the lighting LEDs 11 is implemented when a PWM signal output from the PWM circuit 129 is transmitted to the LED lighting control IC 41 through the photocoupler 42 so as to control an output current that is output from the drive terminals DT1, DT2.

When visible light is transmitted under control of the microcomputer 60, data is transmitted in compliance, for instance, with the visible light communication standard JEITA CP-1223 "Visible Light Beacon System". The CPU 120 reads a frame type and a payload, which are set in a specific area of the SRAM 122, rearranges data in the order of transmission, and performs CRC arithmetic processing to provide outgoing data except for a preamble. Subsequently, the PWM circuit 129 and an interrupt to the CPU are used as described earlier to consecutively transmit a preamble and a 4 PPM-endcoded frame. A data transmission process and a dimming process can coexist when a feedback process is enabled. The feedback process is implemented when the photodiode 70 receives data transmitted from the lighting LEDs 11 and the CPU 120 checks for error in the received data with respect to the transmitted data and determines, for example, illuminance in accordance with the received data.

The microcomputer 60 implements a motion detection signal reception function as the motion receiver 27. More specifically, a motion detection signal, which is a voltage signal generated by the motion sensor 71, is rendered convertible in a second analog-to-digital conversion channel of the ADC 125. An interrupt request is issued each time an analog-to-digital conversion is completed. In response to a cause (analog-to-digital conversion in the second analog-to-digital conversion channel) of the interrupt request, the CPU 120 branches off to a motion reception process. For example, the CPU 120 determines in accordance with a signal detected by the motion sensor 71 whether a human is nearby. When such detection is made, the CPU 120 performs a predetermined process. For example, when a human is nearby, the CPU 120 can illuminate the LED lamp and simultaneously cause the LED module 3 to use visible light to transmit a visible light signal having, for example, location information. Further, when a reception is detected by the photodiode 70, a visible light signal transmitted, for instance, from a terminal can be received. Received data can be given from the microcomputer 60 to the PLC communication IC 23 in order to transmit the data, for example, to a server device through the power line 31.

The power supply/communication module 4 has been described on the assumption that the PLC communication IC 23 includes the microcomputer 82, which is different from the microcomputer 60. Alternatively, however, only one microcomputer may be used to satisfy requirements on a processing speed, memory size, and peripheral functions. For example, a microcomputer that satisfies the requirements on the processing speed, memory size, and peripheral functions may be disposed in the PLC communication IC 23 and allowed to exercise the functions of the other microcomputer 60.

<<Specifications for Visible Light Communication Based on the LED Lamp>>

Figure 10:
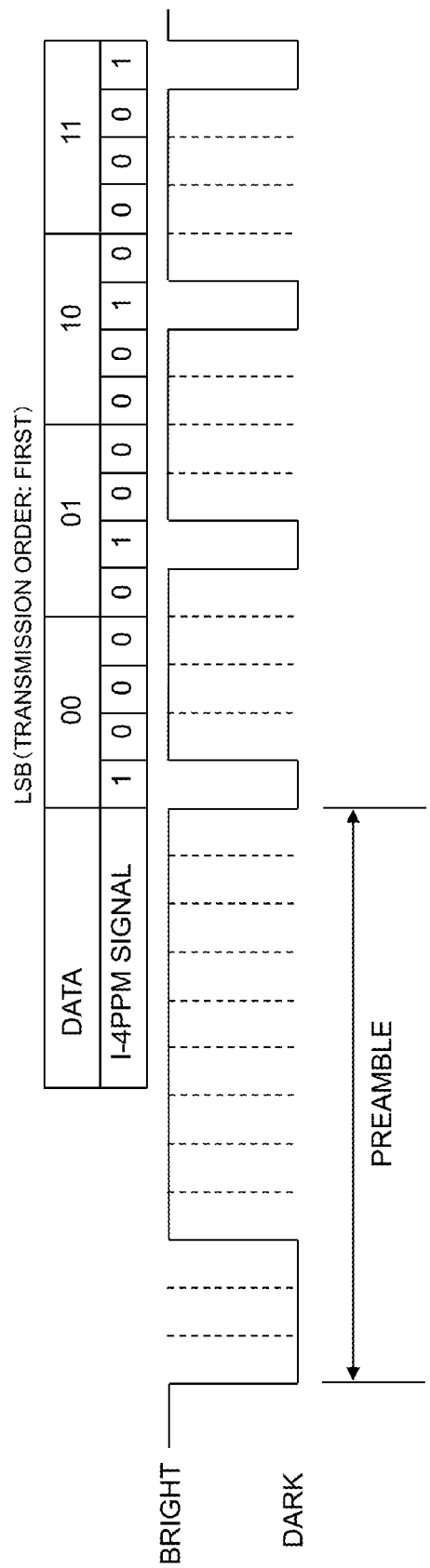
FIG. 10 is a diagram illustrating the specifications for visible light communication based on an LED lamp.

FIG. 10 illustrates the specifications for visible light communication based on the LED lamp. The specifications illustrated in FIG. 10 are compliant with the visible light communication standard JEITA CP-1223 "Visible Light Beacon System". The specifications are defined so that a carrier wavelength of 380 to 780 nm is used at a data rate of 4.8 kb/s while logically inverted 4 PPM (I-4 PPM) is employed as an encoding method. As shown in FIG. 10, 2-bit data is expressed by four slots so as to determine a data value in accordance with bright/dark path width of illumination. A preamble is attached to a leading end. A frame includes the preamble, a frame type, a payload, and an end of frame. Payload 1 includes 128 bits. The end of frame is a 16-bit CRC field. The above-described specifications are merely exemplary and may be changed as necessary.

<<Power-line Network System>>

Figure 11:
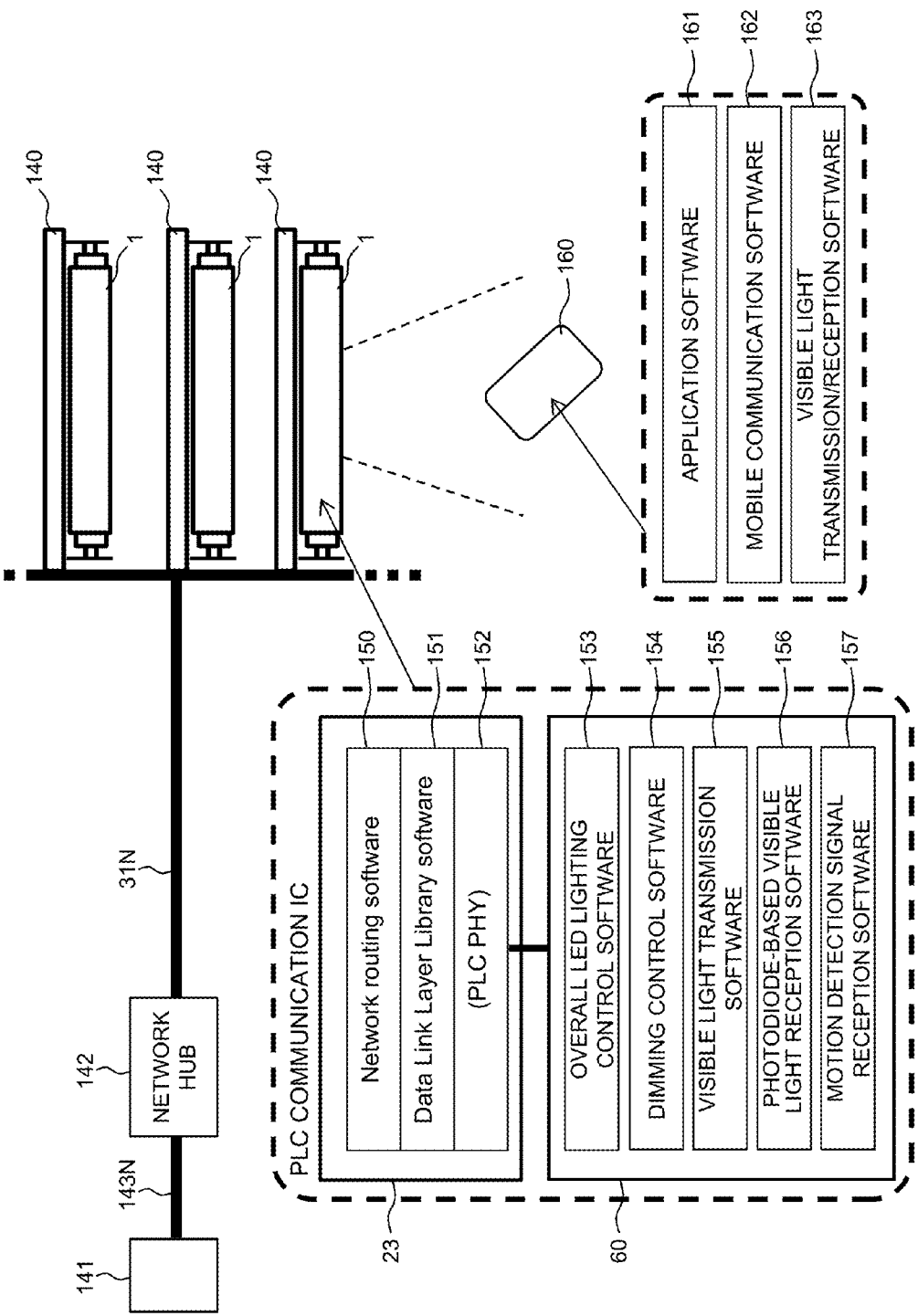
FIG. 11 is a diagram illustrating a power-line network system.

FIG. 11 illustrates a power-line network system. The power-line network system includes a power-line network 31N, a plurality of LED lamps 1 coupled to the power-line network 31N through connectors 140, and a network hub 142 that acts as an interface between power-line communication based on the power-line network 31N and communication based on another communication network 143N. The other communication network 143N may be a local area network, a mobile communication network, or other information and communications technology network called an ICT network. The network hub 142 is a communication device having a terminal adapter function and a router function. No other PLC terminals are prevented from being disposed in the power-line network 31N. A server device 141 is coupled to the other communication network 143N. Current information about an installation location to be stored in the LED lamps 1 can be distributed to the server device 141.

The LED lamps 1 are configured as described above so that main software programs of the microcomputer 82 in the PLC communication IC 23 are, for example, network routing software 150, data link layer library software 151, and software of a PLC physical section (PLC PHY) 81. Main software programs of the microcomputer 60 for providing LED control are, for example, overall LED lighting control software 153, dimming control software 154, LED-based visible light transmission software 155, photodiode-based visible light reception software 156, and motion detection signal reception software 157.

It is conceivable that the lighting LEDs 11 transmit visible light to and the photodiode 70 receive visible light from a data communication terminal 16, such as a personal digital assistant (PDA) represented by a smartphone. The data communication terminal 16 includes, for example, application software 161, mobile communication software 162, and visible light transmission/reception software 163.

The above-described power-line network system makes it possible to provide an indoor location information transmission system that uses LED lamps to supply location information, such as current location information and surrounding area information, to a smartphone, a tablet, or a special-purpose terminal. The power-line network system ensures that the power-line network 31N to which the LED lamps 1 are coupled can be used as a communication network. Therefore, when the server device 141, which provides centralized management of the location information stored in the LED lamps 1, is disposed in an external communication network through the network hub 142, the location information can be written into the LED lamps 1 through the power-line network 31N. This increases the efficiency of a location information write operation (saves labor) and achieves cost reduction. Centralized management can be provided for the maintenance of the LED lamps 1 by using the server device 141 or the like.

<<Method of Writing Location Information into an LED Lamp>>

The following describes a method for writing location information about an LED lamp 1, which is coupled to the power-line network 31N, into the LED lamp 1 by using the server device 141 that can be interfaced through the power-line network 31N.

Figure 12:
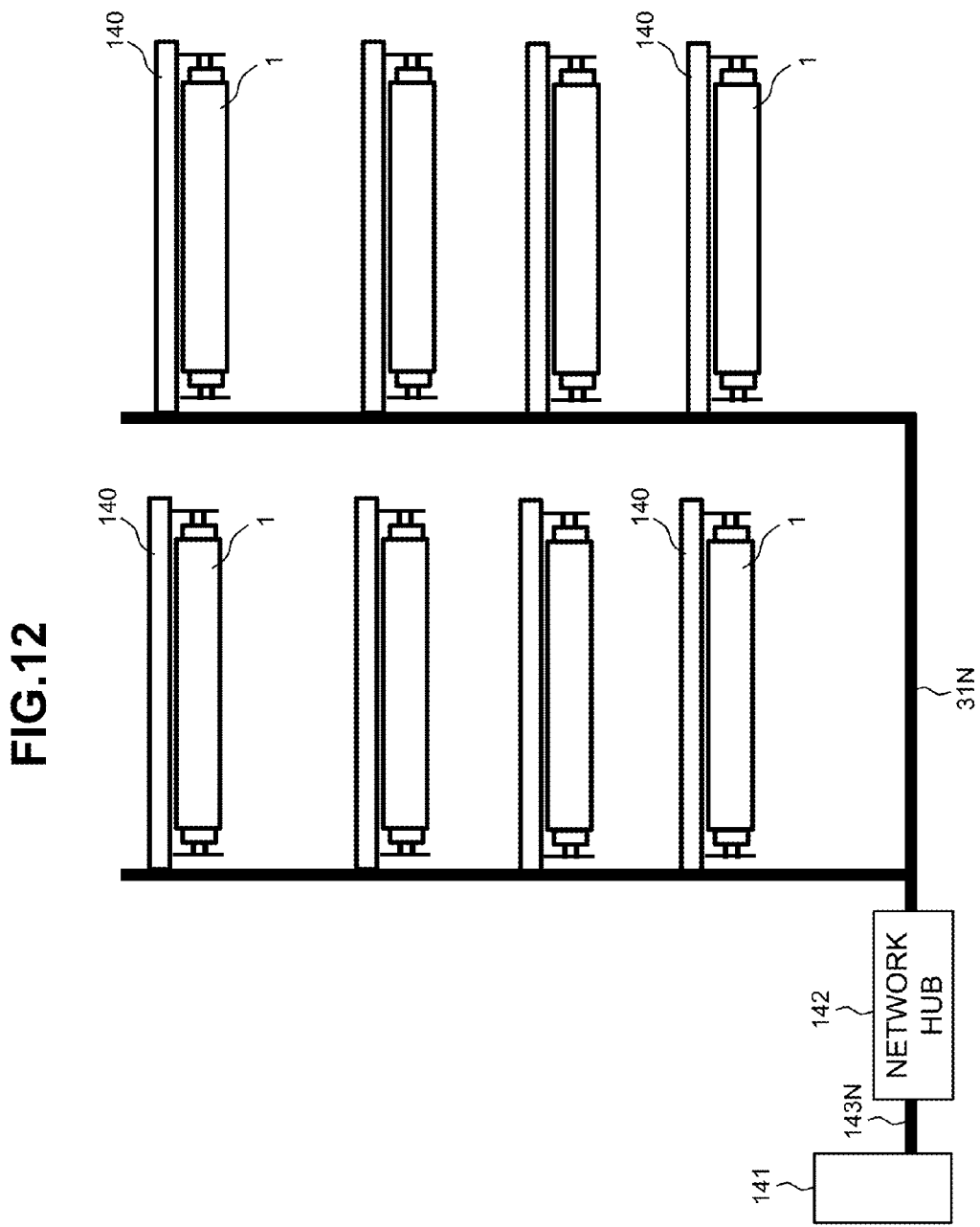
FIG. 12 is a diagram showing an indoor power-line network system that is contemplated for acquiring a database.

The server device 141 acquires a database in which the ID of an LED lamp is associated with location information. Let us assume, for example, an indoor power-line network system as shown in FIG. 12. First of all, when the indoor power-line network system is studied, the locations of LED lamps 1 from which location information is to be transmitted are identified in CAD data such as a provided or newly created building plan view and electrical equipment drawing. In this instance, there may be a case where all the LED lamps in a building do not have to transmit the location information. Therefore, the LED lamps 1 that transmit the location information are determined while considering the accuracy of indoor locations to be determined.

Figure 13:
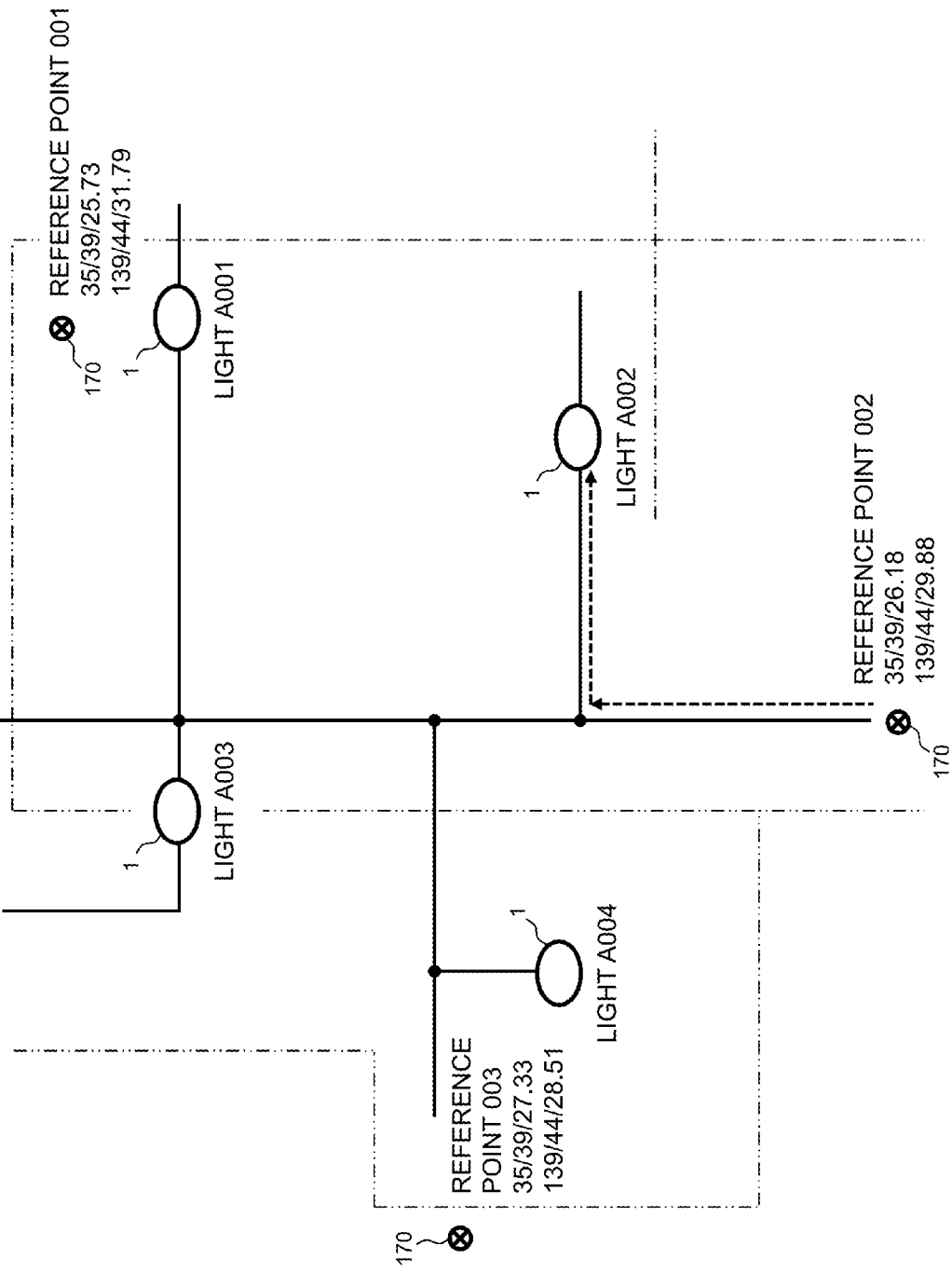
FIG. 13 is a diagram showing location coordinate reference points for acquiring LED lamp location information to be transmitted.

For example, the location information about the LED lamps 1 that should transmit the location information is determined as described below. As illustrated, for instance, in FIG. 13, a plurality of location coordinate reference points 170 are set near a boundary between the inside and outside of a building. The locations of the location coordinate reference points 170 are then properly measured with a GPS or other satellite to store location coordinate data (latitude/longitude information) about the location coordinate reference points 170. In other words, the locations and location coordinates of the actually measured and stored location coordinate reference points 170 are recorded as the above-mentioned CAD data. In this instance, when at least three spots are actually measured in order to be able to transmit accurate indoor location coordinates, location corrections can be made to increase the accuracy of location information. The server device 141 computes to determine the location information indicative of latitude and longitude of the LED lamps that should transmit the location coordinate information by using location measurement data (latitude/longitude information) about three or more previously measured location coordinate reference points 170, actually measured spots indicated by the CAD data such as the building plan view and electrical equipment drawing, and distance data about the LED lamps and by using a calculation formula for the Japan horizontal datum on the assumption that a longitude of 0.01 sec equals 308.20188 mm and that a latitude of 0.01 sec equals 251.53129 mm. When the building has a plurality of stories, the floor level of a specific location should also be determined. In FIG. 13, lights A001 to A004 are light numbers that identify the LED lamps 1.

When the above-described database generation method is employed, the CAD data such as the building plan view and electrical equipment drawing can be used to identify the installation locations of the LED lamps 1. The generation of the database is facilitated because the latitude and longitude of the installation locations of all the LED lamps 1 need not be directly observed.

FIG. 14 illustrates entry information in a database that uses LED lamp location information acquired by a computation method described with reference to FIG. 13. The database is possessed by the server device 141 and formed of a data table that associates the location information about each LED lamp 1 and its ID. The ID includes, for example, an LED lamp's product number and product serial number. The product number is a manufacturer ID such as "0008", and the product serial number is a specific number such as "31246505". The location information includes the latitude, the longitude, and the floor level. Here, the light number is handled as an entry number.

Figure 15:
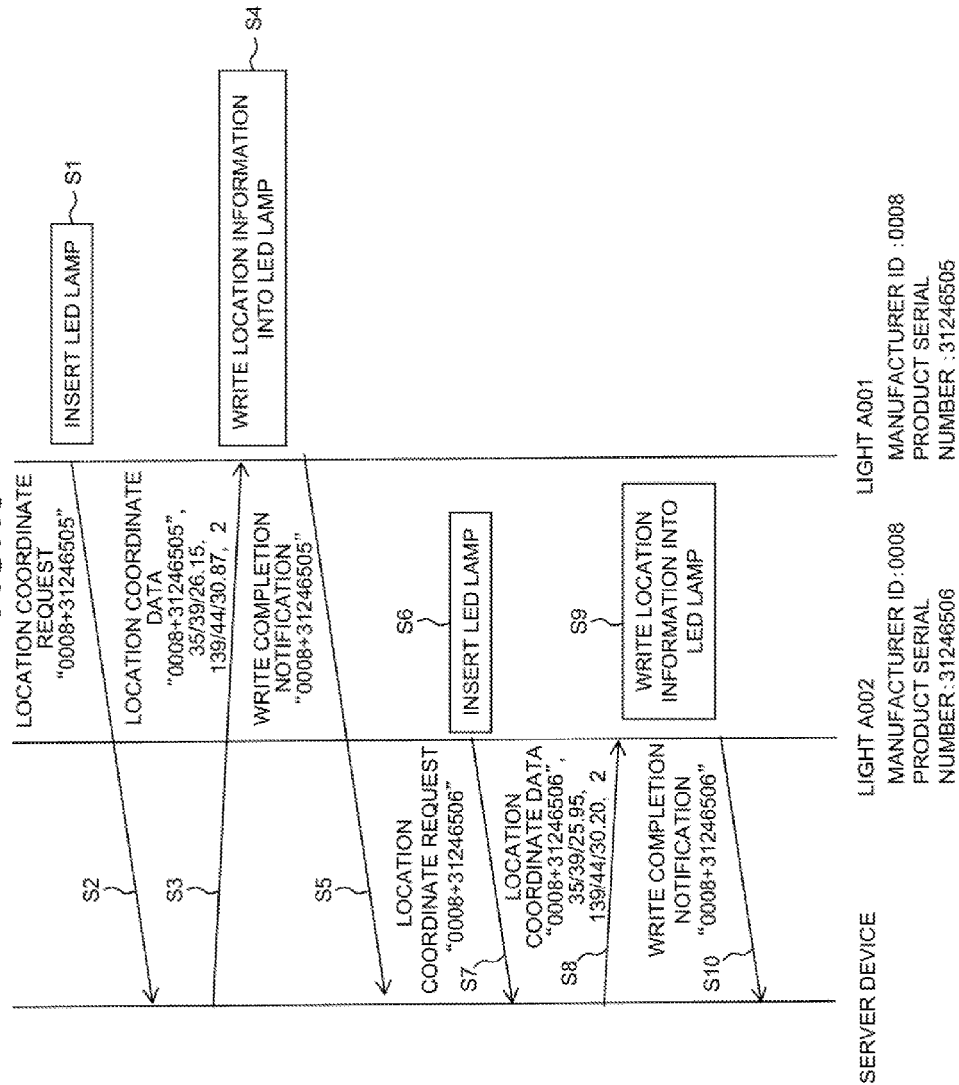
FIG. 15 is a flow diagram illustrating how location information is written into LED lamps.
Figure 16:
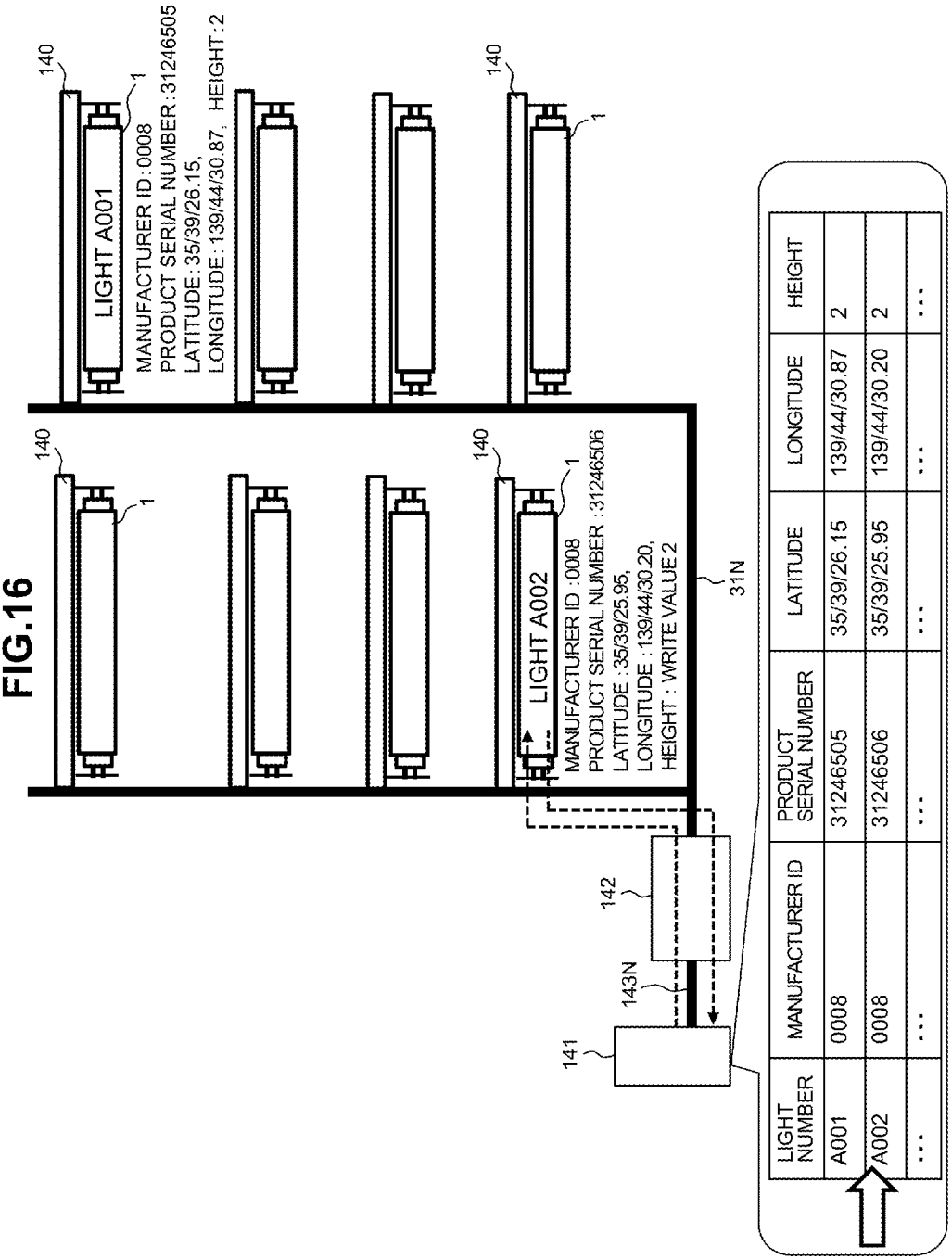
FIG. 16 is a system diagram illustrating a write operation shown in FIG. 15.

FIG. 15 is a flow diagram illustrating how the location information is written into the LED lamps. FIG. 16 is a system diagram illustrating a write operation shown in FIG. 15. As illustrated in FIG. 15, a process is performed for each LED lamp by inserting an LED lamp and writing the location information into the LED lamp. When, for instance, an LED lamp 1 having the light number A001 is inserted into a connector 140 (step S1), the server device 141 receives a location information write request that is transmitted from the LED lamp 1 having the light number A001, which is coupled to the power-line network 31N through the connector 140 (step S2). The server device 141 acquires the ID (0008+31246505) of the requesting LED lamp from the received location information write request, searches the database to retrieve the associated location information by using the acquired ID, and transmits the retrieved location information to the power-line network 31N (step S3). The LED lamp 1 having the light number A001, which has the ID of the requesting LED lamp, writes the location information transmitted to the power-line network into its non-volatile storage device (step S4). Finally, the LED lamp 1 having the light number A001 notifies the server device 141 of the completion of the write operation and its ID (step S5). The same process (steps S6 to S10) is performed for the other LED lamp 1 having the light number A002.

When the above-described writing method for location information is employed, the relative location of the LED lamp 1 can easily be acquired by using data such as an indoor electrical wiring diagram and a building structural drawing. Further, the location information (latitude/longitude information) about each LED lamp 1 can also be acquired with ease by using a representative absolute location (latitude/longitude information) and the relative location. This makes it easy to build the database. Furthermore, as the LED lamp 1 is coupled to the power-line network 31N, the location information write request is issued (steps S2 and S7). Hence, the server device 141 transmits the associated location information to the power-line network (steps S3 and S8). Upon receipt of the transmitted location information, the LED lamp 1 writes the location information into its nonvolatile storage device 24 (steps S4 and S9). This increases the efficiency of the location information write operation. There is no need to couple a write interface cable to the LED lamp 1 on an individual basis and repeatedly perform the write operation. The server device can be used as mentioned earlier to provide centralized management of a location information rewrite subsequent to LED lamp 1 replacement.

<<Applying the Power-line Network System to a Commercial Facility>>

Figure 17:
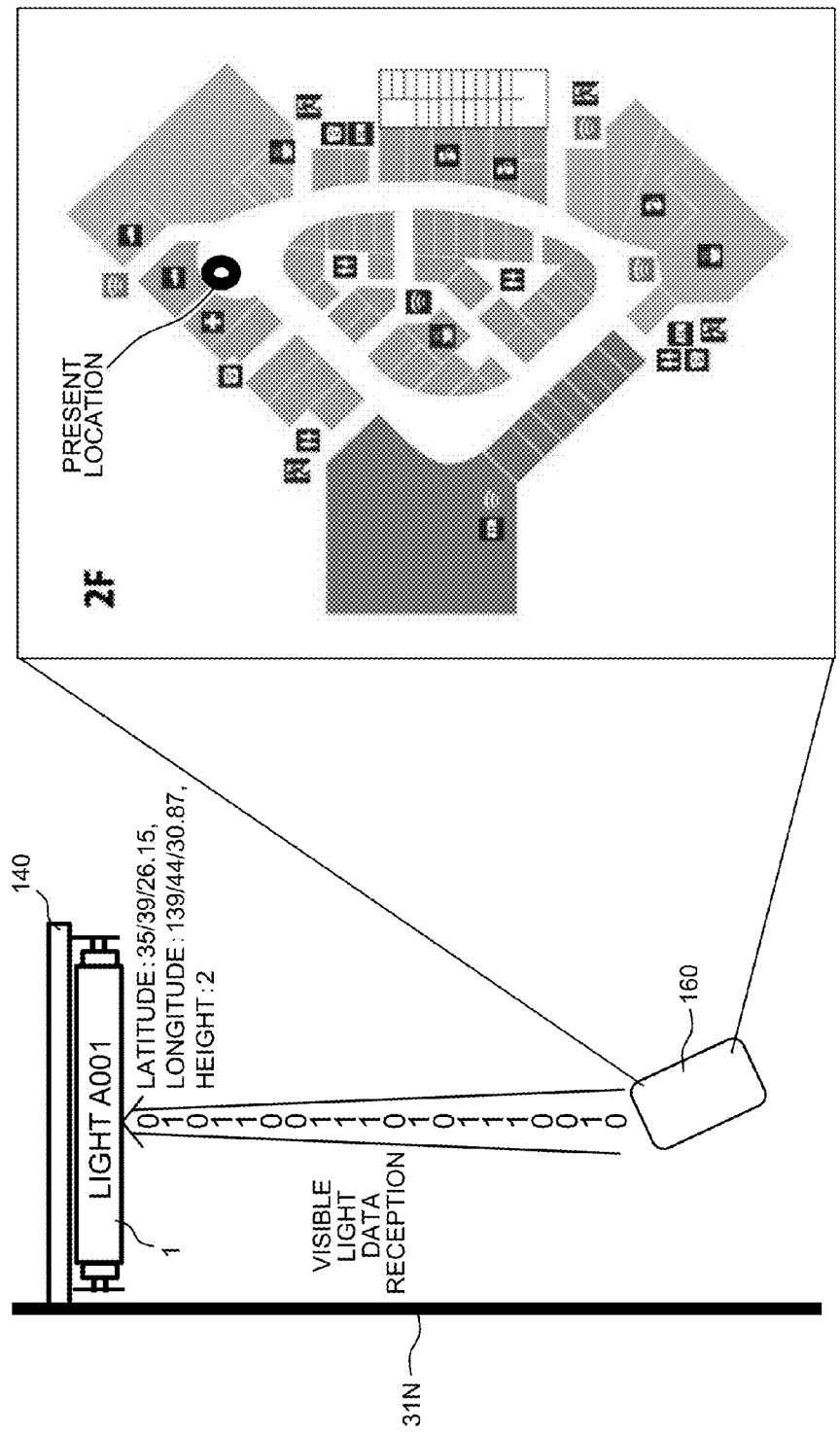
FIG. 17 is a diagram illustrating a case where an indoor location information transmission system is built by using an LED lamp installed in a commercial facility.

FIG. 17 illustrates a case where an indoor location information transmission system is built by using an LED lamp 1 installed in a commercial facility. Indoor location information is transmitted from a ceiling-mounted LED lamp 1 to let a smartphone, a tablet, a special-purpose terminal, or other visible light reception terminal 160 match the indoor location information with a facility internal map. This enables the facility internal map to display a current location. Thus, the power-line network system can be used, for instance, to distribute nearby shop information, provide indoor navigation, or indicate an escape route in emergency.

As is obvious from the above explanation, the LED lamps 1 having the power supply/communication module 4 in which the power-line communication section 23 and the first visible light communication section 22 are built are used. The database in which location coordinates calculated by using the CAD data such as an electrical equipment drawing are associated with the ID of the LED lamp 1 is built in the server device 141. The LED lamps 1 are coupled to the server device 141 through the power-line network 31N to permit the server device 141 to write individual location coordinates into the LED lamps 1. This makes it possible to save labor required for system installation and reduce an initial cost. Further, only the installation of the LED lamps 1 is required, and it is not necessary to cut or change power cables. Therefore, the power-line network system can be implemented by a person who is not qualified to perform electrical work.

The server device 141 can intensively perform various functions, for instance, to exercise LED dimming control and make power consumption measurements. Further, the LED lamps 1 that transmit a location coordinate signal can easily be additionally installed or reduced in number. This makes it possible to reduce the cost of maintenance.

Figure 18:
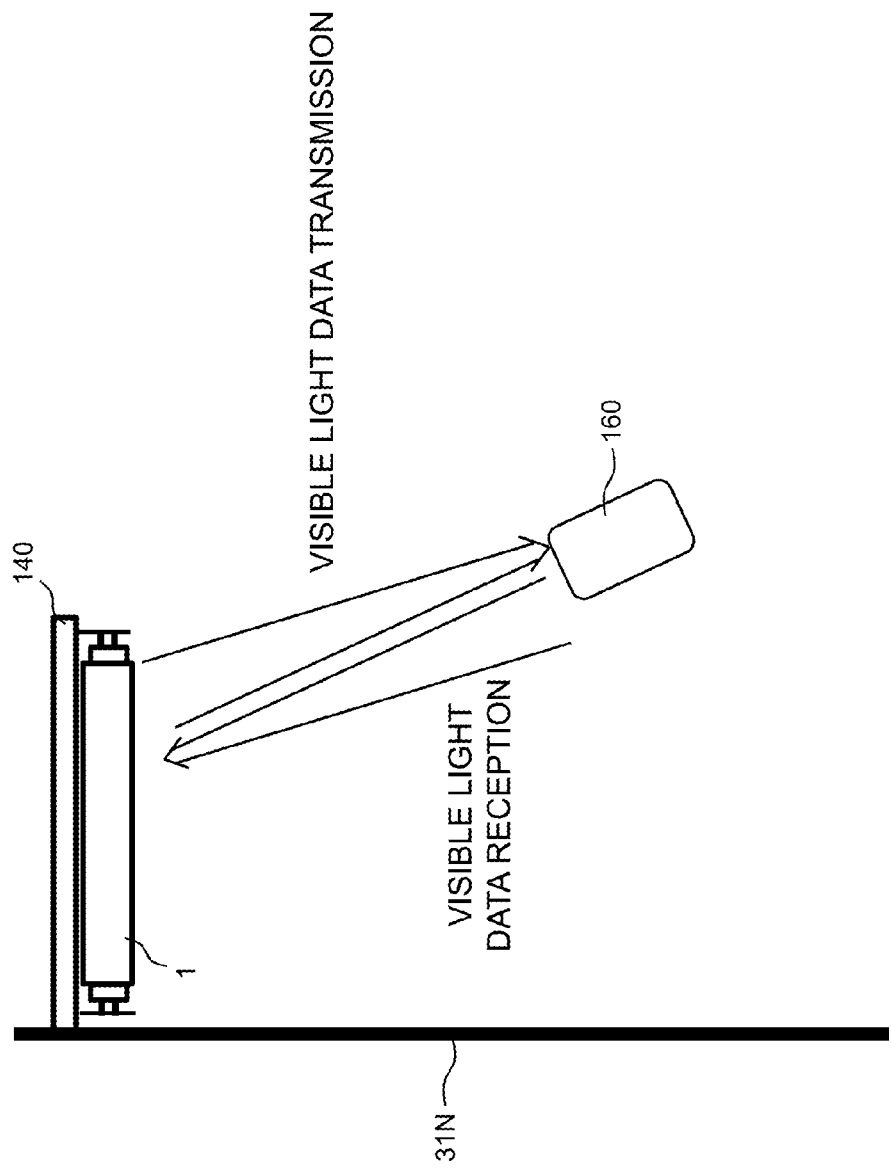
FIG. 18 is a diagram illustrating a case where visible light transmission/reception is performed.
Figure 19:
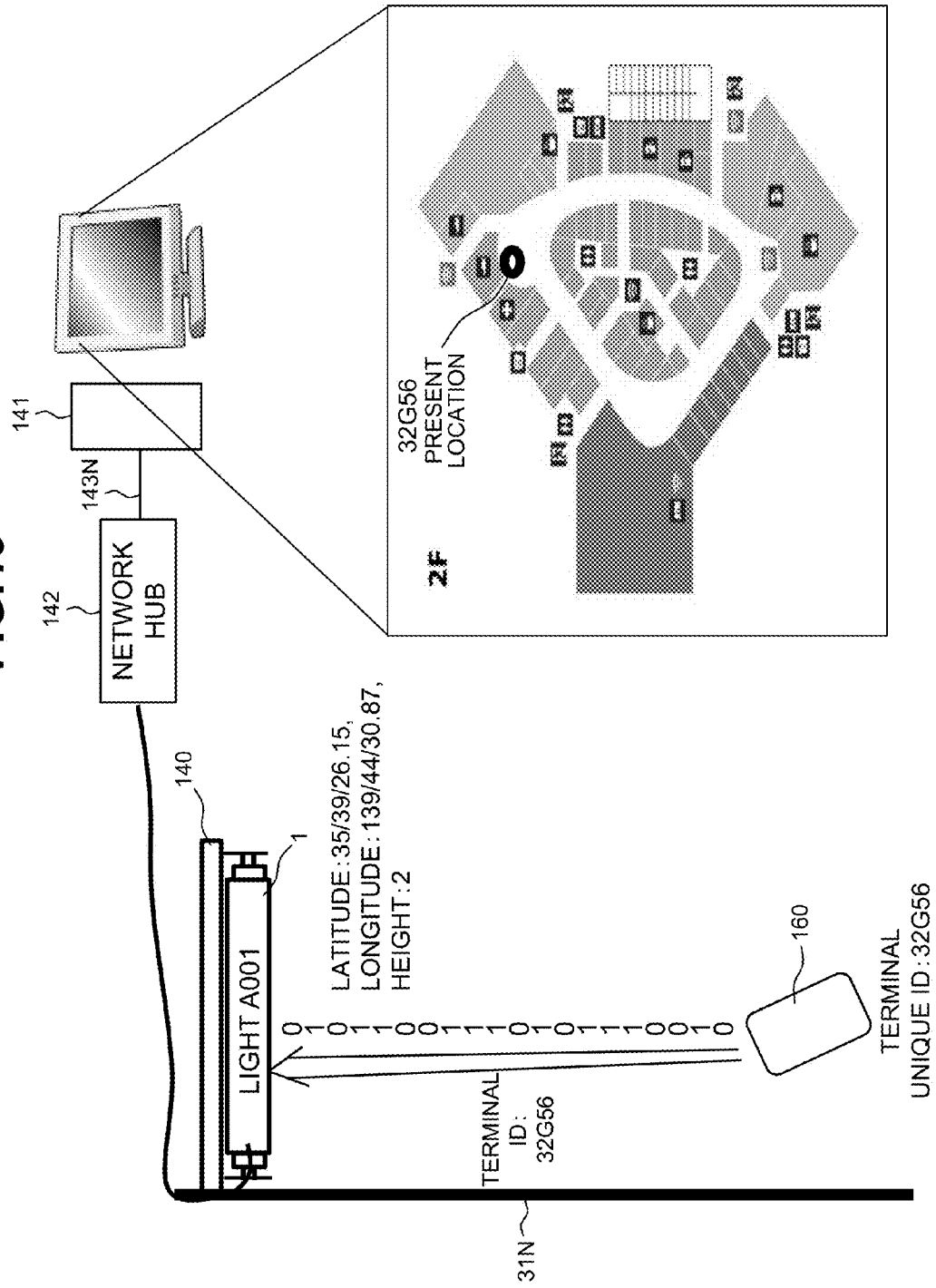

FIG. 18 illustrates a case where visible light transmission/reception is performed. The visible light communication function incorporated in an LED lamp 1 is exercised to permit not only the first visible light communication section 22 to perform transmission but also the second visible light communication section 26 to perform transmission. Thus, as shown in FIG. 18, bidirectional communication is established between the LED lamp 1 and the visible light reception terminal 160 such as a smartphone or a tablet. Hence, as illustrated in FIG. 19, the visible light reception terminal 160 can transmit information to the server device 141 and the like through the LED lamp 1 and the power-line network 31N. For example, in the indoor location information transmission system, upon receipt of location information from the LED lamp 1, the visible light reception terminal 160 transmits its own ID to the LED lamp 1. The LED lamp 1 then conveys the transmitted ID to the server device 141 through the power-line network 31N. This enables the server device 141 in a commercial facility to easily record the current location and moving path of a human and of an object.

Figure 20:
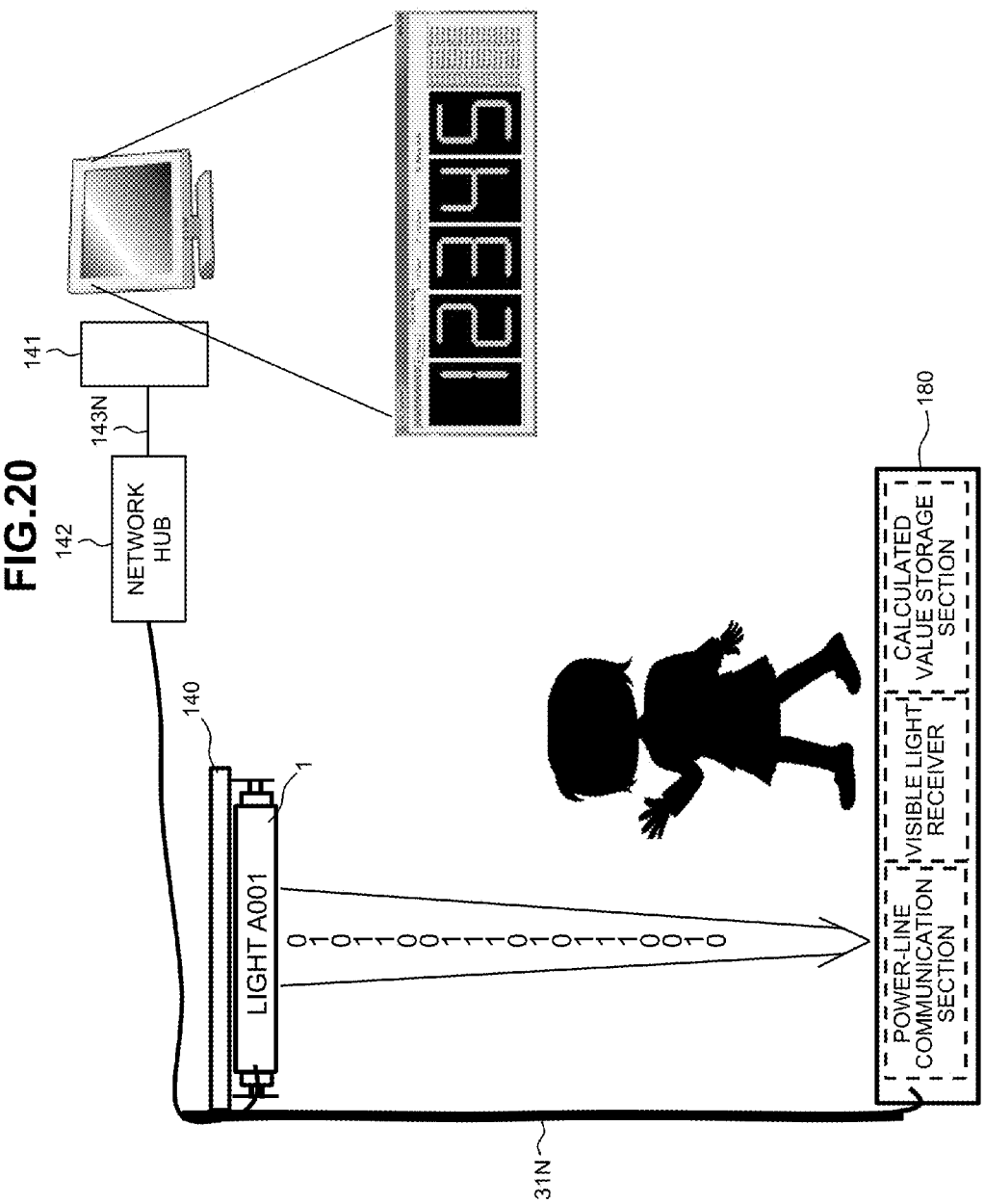
FIG. 20 is a diagram illustrating an application where a count receiver mounted, for instance, over a floor receives a visible light communication signal transmitted from an LED lamp in order to detect the passage of a human or an object.

FIG. 20 illustrates an application where a count receiver 180 mounted, for instance, over a floor receives a visible light communication signal transmitted from an LED lamp 1 in order to detect the passage of a human or an object. When a human or an object passes between the LED lamp 1 and the count receiver 180, light is intercepted to interrupt communication. The count receiver 180 detects such a communication interruption, increments its count upon each detection, and stores the resulting count. The stored count is transmitted to the server device for storage purposes through the power-line network 31N at a predetermined point of time or at fixed time intervals. As a result, the LED lamp 1, which is usually used for lighting purposes, can be used to easily count, for example, the number of persons passing through a gate, for instance, for exit.

Instead of using the count receiver 180, the second visible light communication section 26 may be used to receive light reflected from the LED lamp 1 through the photodiode 70 and increment its count for storage purposes. If the LED lamp 1 includes the motion receiver 27, the motion sensor 71 may alternatively be used to let the motion receiver 27 directly detect the passage of a human.

Figure 21:
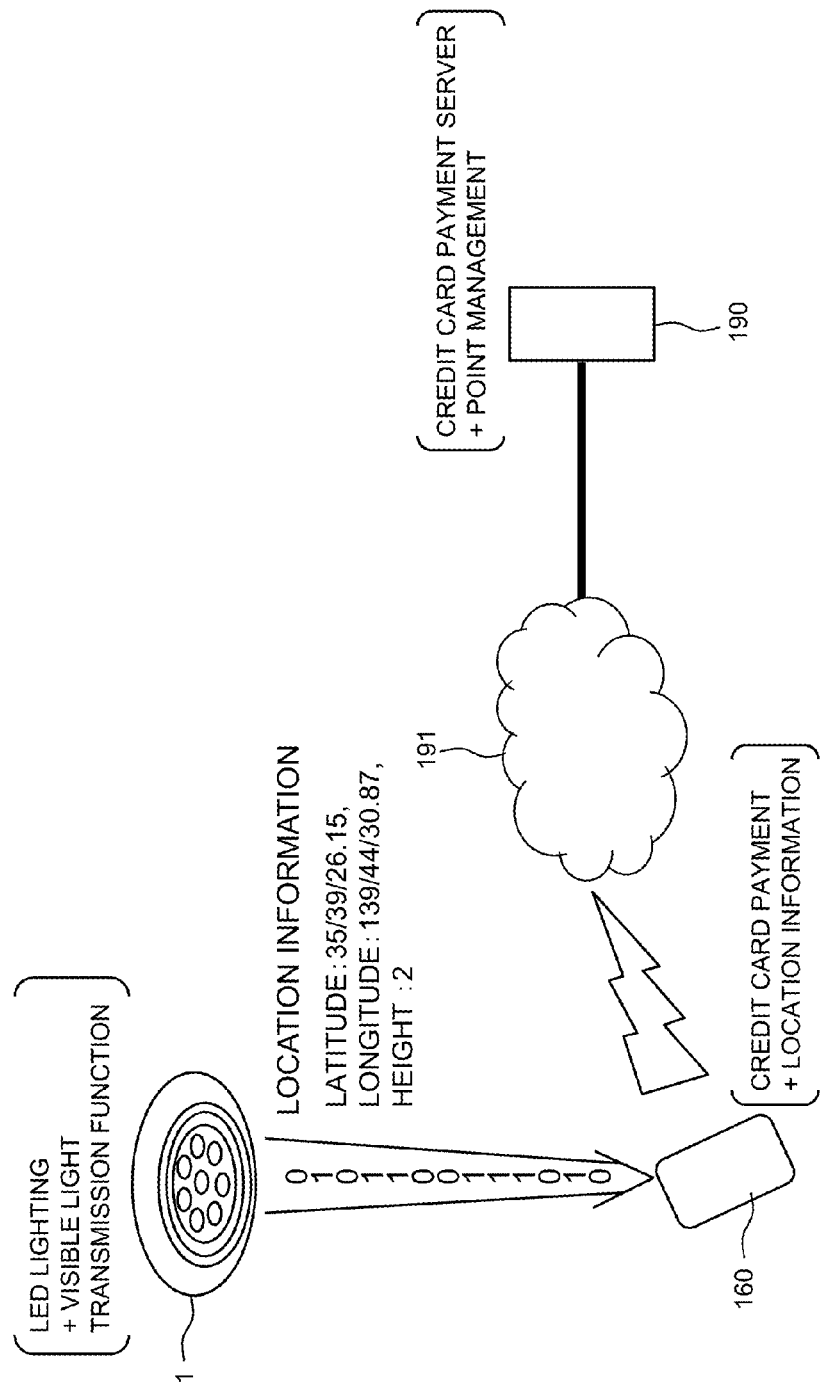
FIG. 21 is a diagram illustrating an application for improving the security of a payment system.

FIG. 21 illustrates an application for improving the security of a payment system. For a credit card payment that is performed through a mobile communication network 191 in which a smartphone or other mobile terminal 160 is used, location information about, for example, a shop can be added by means of visible light communication to build a highly secure payment system although a high security risk exists. In addition, the above-described location information transmission system can also be used for O2O (offline-to-online) sales promotion and marketing. It is conceivable that the location information handled by visible light communication may be utilized as evidence of a visit to a particular shop. Such use of the location information makes it possible to provide services, for example, to give certain points or a discount to a club member who frequently visits the shop. Referring to FIG. 21, the reference numeral 190 denotes a credit card payment server.

As is obvious from the above, using the above-described location information transmission system makes it possible to acquire the location information with ease and create a new business model by utilizing the location information.

Figure 22:
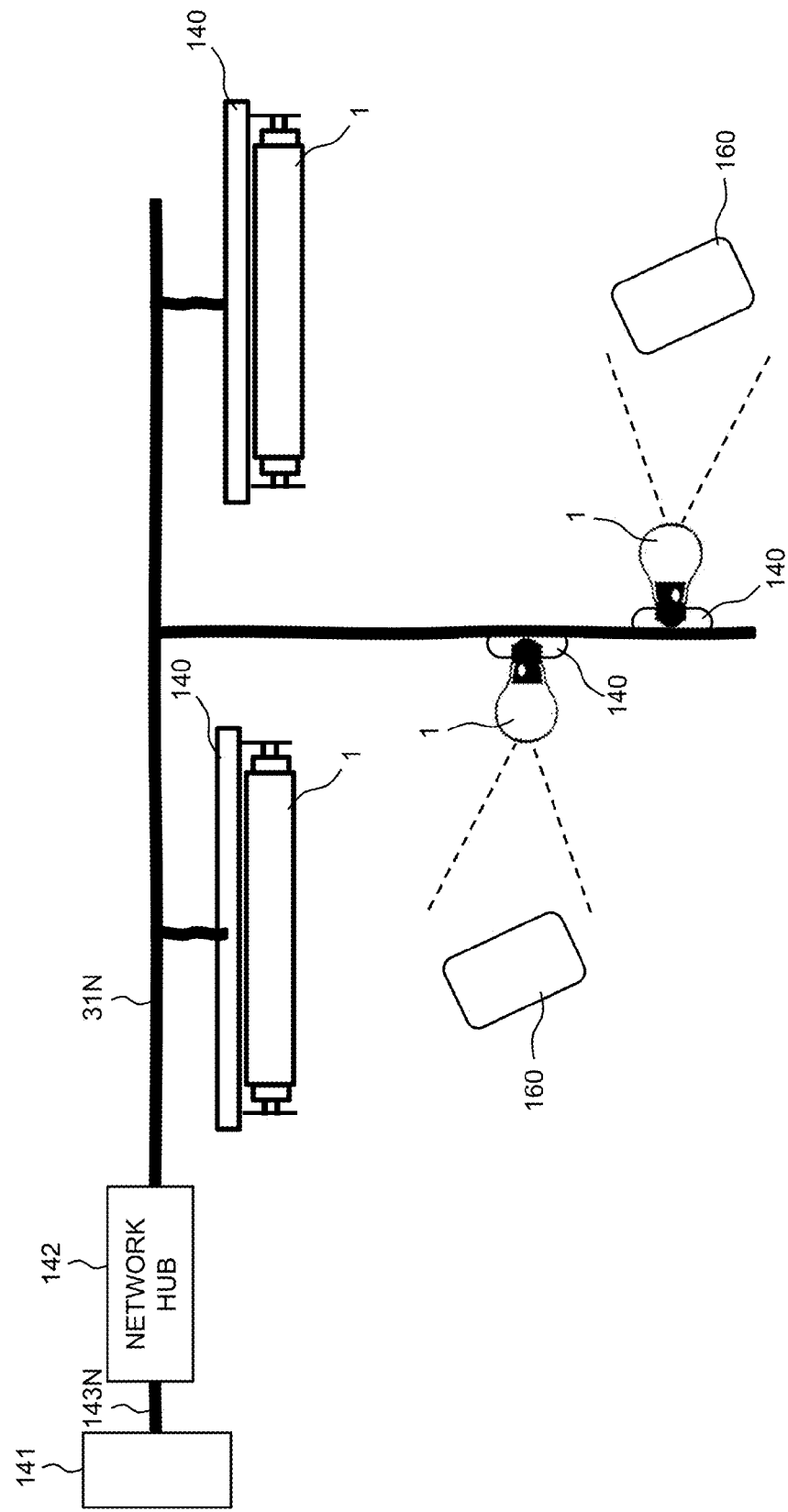
FIG. 22 is a diagram illustrating a power-line network system in which visible light communication based on LED lamps handles not only location information but also surrounding area information or specific information irrelevant to location.

FIG. 22 illustrates a power-line network system in which visible light communication based on LED lamps handles not only location information but also surrounding area information or specific information irrelevant to location.

The foregoing description relates to a case where the location information about LED lamps 1 is transmitted by means of visible light communication. However, the power-line network system is not limited to such an application.

In the power-line network system shown in FIG. 22, the database built in the server device 141 includes surrounding area information for each light number in addition to the location information in contrast to the entries shown in FIG. 14. The surrounding area information may be handled in place of the location information based on latitude and longitude. In the example shown in FIG. 22, straight tube type LED lamps 1 and light bulb type LED lamps 1 each include at least the first visible light communication section 22 for transmission in order to establish visible light communication. The visible light reception terminal 160, such as a smartphone, a tablet, or a special-purpose terminal, can receive the surrounding area information and location information transmitted from the LED lamps 1 and display the received information on its display.

A case where the power-line network system is built in a supermarket, a department store, or other commercial facility will be described below as an example.

As is the case with the above-described location information distribution, the server device 141 outputs the surrounding area information and location information or the surrounding area information without the location information to the power-line network 31N together with the ID of an LED lamp, and the power-line communication section 23 of the LED lamp associated with the ID receives the surrounding area information and the like and stores the received information in the flash memory 24. The flash memory 24 has the location information storage area PA and a storage area NA for storing the surrounding area information. The stored information is transmitted by the LED lamp 1 by means of visible light communication, received by the visible light reception terminal 160 such as a smartphone, a tablet, or a special-purpose terminal, and displayed.

A card (shelf label) indicative of a product price or other electronic shelf label attached to a display shelf, for instance, in a supermarket is assumed as a concrete example representing a case where the first visible light communication section 22 transmits only the surrounding area information without the location information by using visible light. When an LED lamp 1 is used to illuminate the electronic shelf label, the electronic shelf label can be defined as a terminal having a 7-segment or dot-matrix display that displays a price, a product description, and the like. When the above-described electronic shelf label is used, the LED lamp 1 uses visible light to transmit information such as a product code and price.

Further, in another example, all the LED lamps 1 in the network system can use the first visible light communication section 22 in the event of a disaster or other critical occurrence to transmit visible light in order to send a notification indicative of an abnormality or a cause of abnormality in accordance with an instruction from the server device 141 coupled through the network hub 142 or from an appropriate host device. The notification indicative of an abnormal state or a cause of abnormality may be stored in advance in the flash memory to replace visible light communication information with the notification indicative of an abnormal state or the like in accordance with an instruction from the server device 141 or from the appropriate host device. An alternative is to transmit visible light after switching the visible light communication information in the flash memory from location information to the notification indicative of an abnormality in response to the instruction.

<<Projector>>

Figure 23:
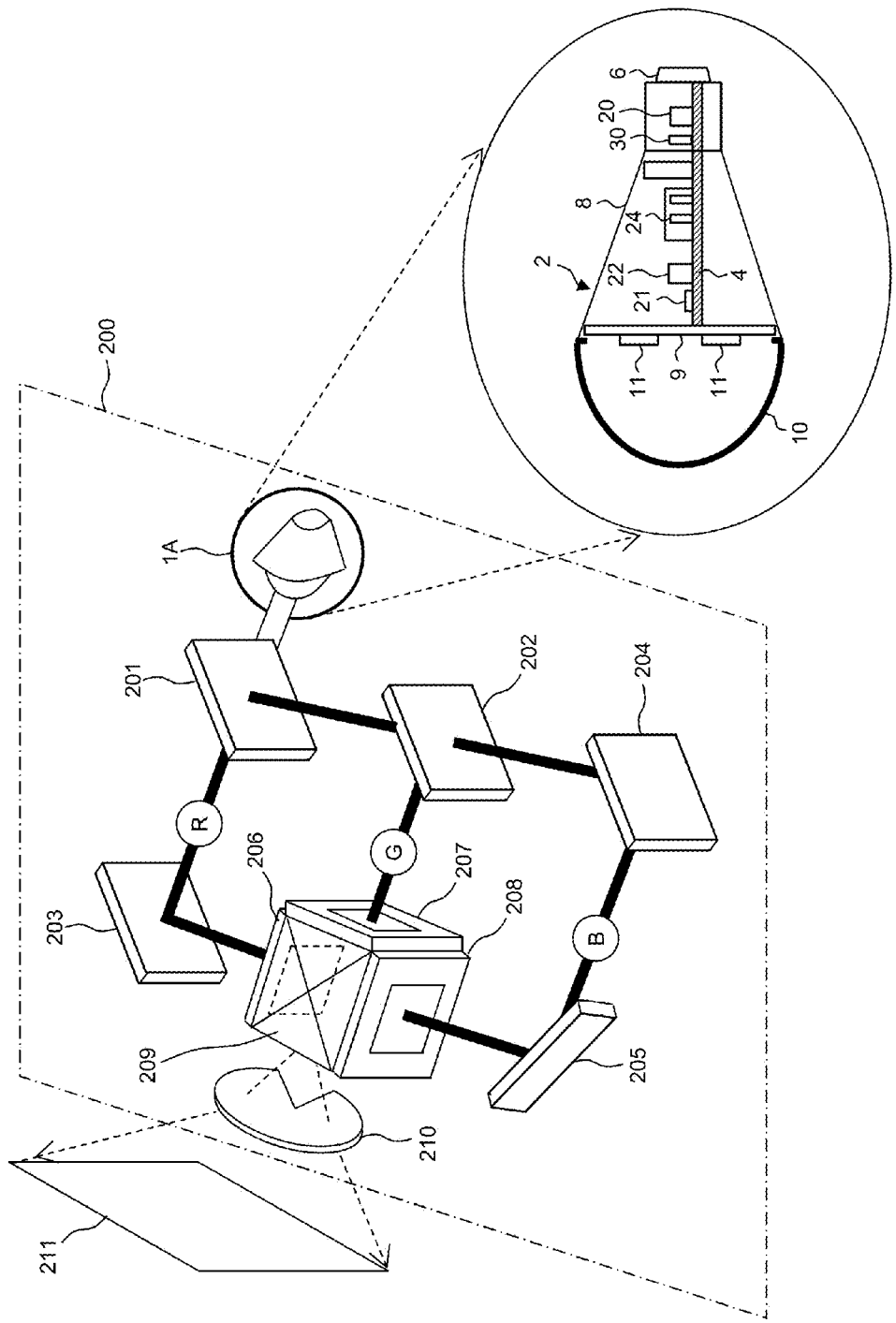
FIG. 23 is a block diagram illustrating the configuration of a projector.

A case where an LED lamp is applied to a projector will now be described. FIG. 23 illustrates the configuration of the projector 200. The reference numeral 1A denotes a light source for the projector 200. The projector 200 uses a dichroic mirror 201 to separate light irradiated from the light source 1A into red (R) light and other light, uses a dichroic mirror 202 to separate the other light into green (G) light and blue (B) light, and allows the lights of three primary colors, namely, red, green, and blue, to be transmitted through transmissive liquid crystal panels 206, 207, 208, respectively. The reference numerals 203 to 205 denote mirrors that direct the separated lights to the associated transmissive liquid crystal panels 206, 208. The transmissive liquid crystal panels 206, 207, 208 respectively form a transmission pattern in accordance with image data. Lights transmitted through the transmissive liquid crystal panels 206, 207, 208 are combined by a prism 209 and forwarded through a lens 210 to generate a color image on a screen 211.

The light source 1A is substantially equivalent to the light bulb type LED lamp 1 described with reference to FIG. 4. The light source 1A is configured so that lighting LEDs 11 and a power supply/communication module 4 for the lighting LEDs 11 are housed in a housing 2 having a base 6 coupled to a power line 31. The power line 31 to which the base 6 is coupled supplies power supply to the power supply/communication module 4. The power supply/communication module 4 includes a power supply circuit 20, an LED drive circuit 21, a first visible light communication section 22, and a power-line communication section 30. The power supply circuit 20 generates internal power supply by using the power supply supplied from the power line 31. The LED drive circuit 21 supplies a drive voltage to the lighting LEDs 11 by using the internal power supply generated by the power supply circuit 20. The first visible light communication section 22 provides control over visible light communication in a transmitting direction through the LED drive circuit 21. The power-line communication section 30 establishes power-line communication through the power line 31. The first visible light communication section 22 uses visible light to transmit specific information that is given through the power-line communication section 30. It is obvious that the power supply/communication module 4 may have the configuration described with reference to FIG. 1 or FIG. 5. However, the nonvolatile storage device 24 stores required specific information related to a color image instead of location information. Although not shown in the figure, it goes without saying that a RAM may be used instead of the nonvolatile storage device 24 to store the specific information.

Figure 24:
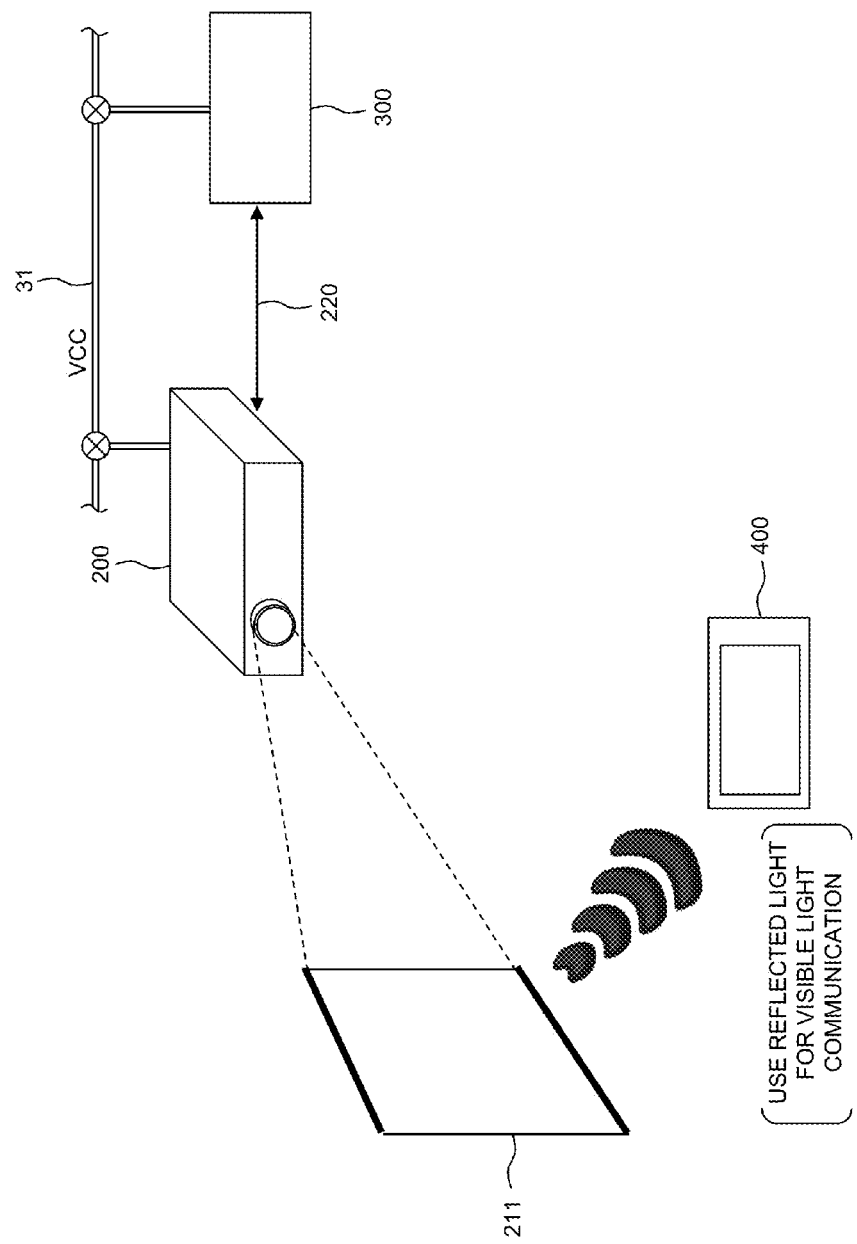
FIG. 24 is a diagram illustrating a usage pattern of the projector shown in FIG. 23.

FIG. 24 illustrates a usage pattern of the projector 200. The projector 200 is coupled to a personal computer (PC) 300, which acts as a host device. The PC 300 supplies image data and specific information to the projector 200. The projector 200 projects a color image onto the screen 211 and superimposes the specific information over its image visible light. A method of irradiating the specific information as visible light is the same as the method described earlier and will not be described in detail. A terminal device 400 is an example of a device that receives light reflected from the screen 211 and inputs the specific information superimposed over the image visible light. To determine the specific information from the reflected visible light, the terminal device 400 may use a method compliant with visible light communication specifications described with reference to FIG. 10.

To supply image data to the projector 200, the PC 300 may use, for example, a serial interface based, for instance, on a serial communication line 220.

Figure 25:
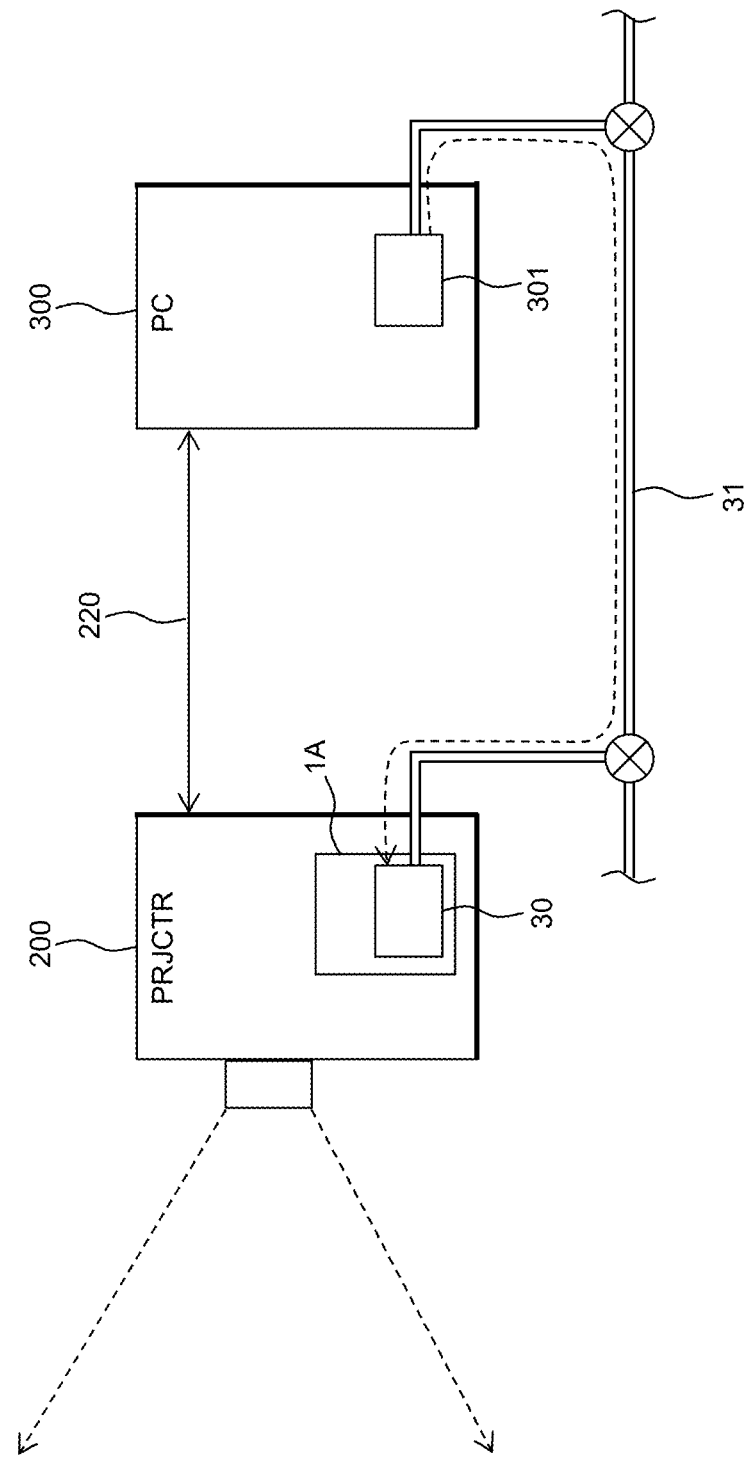
FIG. 25 is a block diagram showing a case where power-line communication is established to supply specific information to a projector through power wiring.

As illustrated in FIG. 25, the specific information to be superimposed over the image visible light by blinking the LED lamp 1A, which acts as the light source, is supplied by means of power-line communication through the power line 31 that supplies operating power VCC to the LED lamp. The supplied specific information is stored, for instance, in the nonvolatile storage device 24. More specifically, when the specific information is supplied from a power-line communication section 301 included in the PC 300 to the power-line communication section 30 of the projector 200 through the power line 31, the first visible light communication section 22 uses visible light to transmit the specific information to the LED drive circuit 21. As described above, the specific information can be given to the projector 200 through the power line 31, which supplies the operating power VCC to the projector 200.

Figure 26:
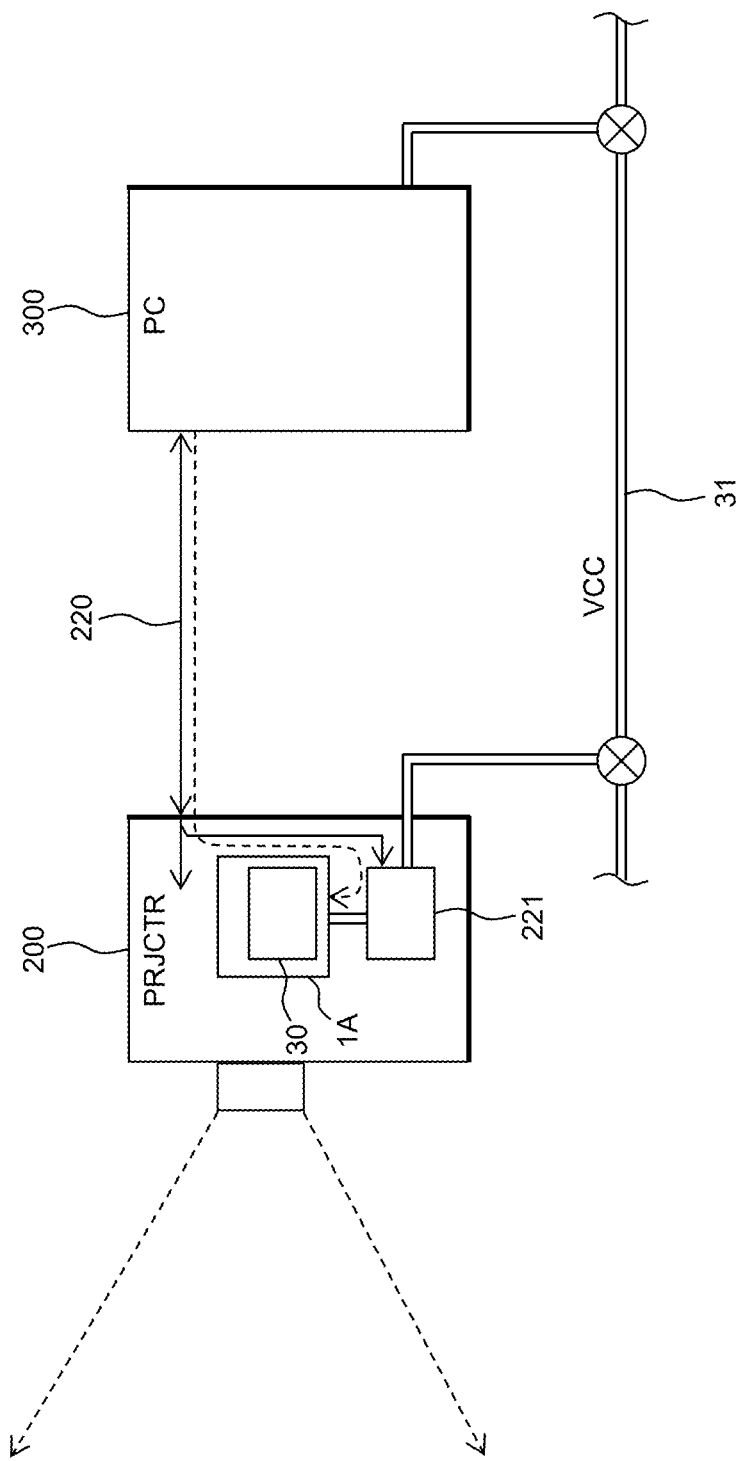
FIG. 26 is a block diagram showing a case where a host device directly gives specific information to a projector.

Alternatively, as illustrated in FIG. 26, the PC 300, which acts as a host device, may directly give the specific information to the projector 200. More specifically, the projector 200 may include an external interface section 221 that acts as an interface between the power line 31 to which the LED lamp 1A is coupled and a serial signal line 220, which is another communication line, and allow the first visible light communication section 22 to use visible light in order to transmit the specific information, which is given from the external interface section 221 through the power-line communication section 30, to the LED drive circuit 21. This enables the PC 300 to give the specific information to the projector 200 by transmitting the specific information to the external interface section 221.

According to the above-described projector 200, the light irradiated from the LED lamp 1A includes specific information, which is superimposed over a generated color image. Therefore, when the terminal device 400 receives light reflected from the color image projected by the projector 200, the terminal device 400 can acquire the superimposed specific information and presents the specific information on the display or processes the specific information in a different manner. As described above, the terminal device 400 can acquire the specific information by using reflected light derived from visible light. Therefore, the range of information diffusion can be more narrowly limited than when, for instance, wireless communication is used. This provides increased security. If, for example, wireless communication is used, the specific information leaks into a neighboring room. However, when visible light communication is used, no such information leakage occurs as far as the employed visible light is blocked. When, for instance, an examination is conducted by projecting exercises onto a large screen in a classroom, visible light rays reflected from the screen may be used to display answer data on the terminal device 400 by means of visible light communication and allow examinees to view the displayed answer data. In this case, the answer data does not leak into a neighboring room.

It is obvious that the LED lamp 1A without the nonvolatile storage device 24 may be applied to the projector 200. An alternative is to use an LED lamp with a RAM or enable the LED lamp to receive necessary data in real time.

<<Collision Avoidance System Based on an LED Lamp>>

Figure 27:
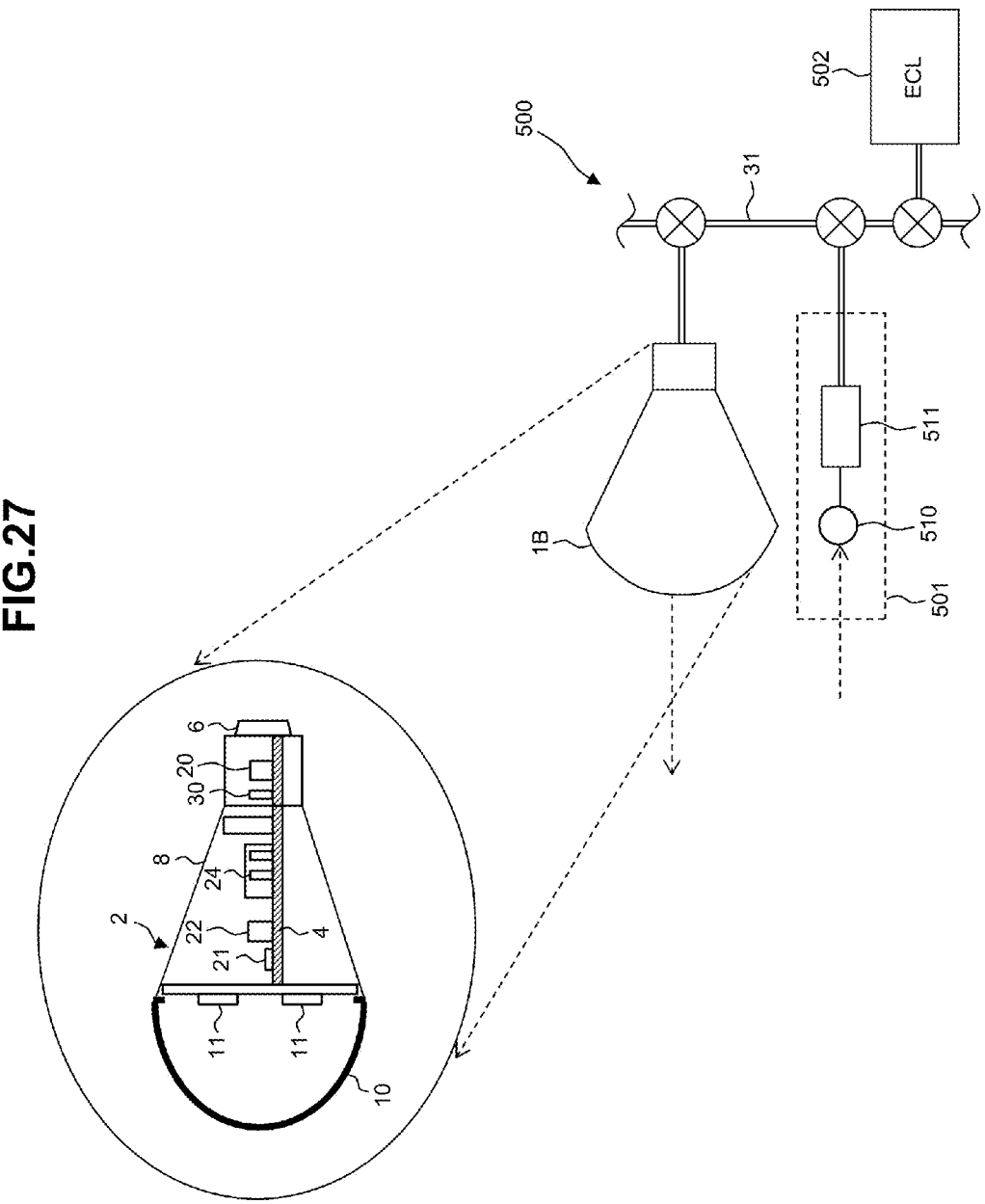
FIG. 27 is a block diagram illustrating a collision avoidance system based on an LED lamp.

FIG. 27 illustrates a collision avoidance system 500 based on an LED lamp. The collision avoidance system 500 includes an LED lamp 1B, a photodetector 501, and a data processing device 502, which are all coupled to a power line 31 to form a power-line network. The LED lamp 1B is incorporated, for instance, as a headlight or taillight of a vehicle such as an automobile.

The LED lamp 1B is substantially equivalent to the light bulb type LED lamp 1 described with reference to FIG. 4. The LED lamp 1B is configured so that lighting LEDs 11 and a power supply/communication module 4 for the lighting LEDs 11 are housed in a housing 2 having a base 6 coupled to the power line 31. The power line 31 to which the base 6 is coupled supplies power supply to the power supply/communication module 4. The power supply/communication module 4 includes a power supply circuit 20, an LED drive circuit 21, a first visible light communication section 22, and a power-line communication section 30. The power supply circuit 20 generates internal power supply by using the power supply supplied from the power line 31. The LED drive circuit 21 supplies a drive voltage to the lighting LEDs 11 by using the internal power supply generated by the power supply circuit 20. The first visible light communication section 22 provides control over visible light communication in a transmitting direction through the LED drive circuit 21. The power-line communication section 30 establishes power-line communication through the power line 31. The first visible light communication section 22 uses visible light to transmit specific information that is given through the power-line communication section 30. The specific information is stored, for instance, in a nonvolatile storage device 24. The power-line communication section 30 establishes power-line communication to acquire the specific information to be stored in the nonvolatile storage device 24. The first visible light communication section 22 uses visible light to transmit the specific information read from the nonvolatile storage device 24.

The photodetector 501 receives light reflected from the front of irradiation direction when the LED lamp 1B irradiates light to convey the specific information. The photodetector 501 includes a photodiode or other visible light sensor 510 and a communication section 511. The communication section 511 inputs a signal from the visible light sensor 510 to provide control over visible light communication in a receiving direction and transmits received information, which is received by visible light reception, to the outside through the power line 31.

Figure 29:
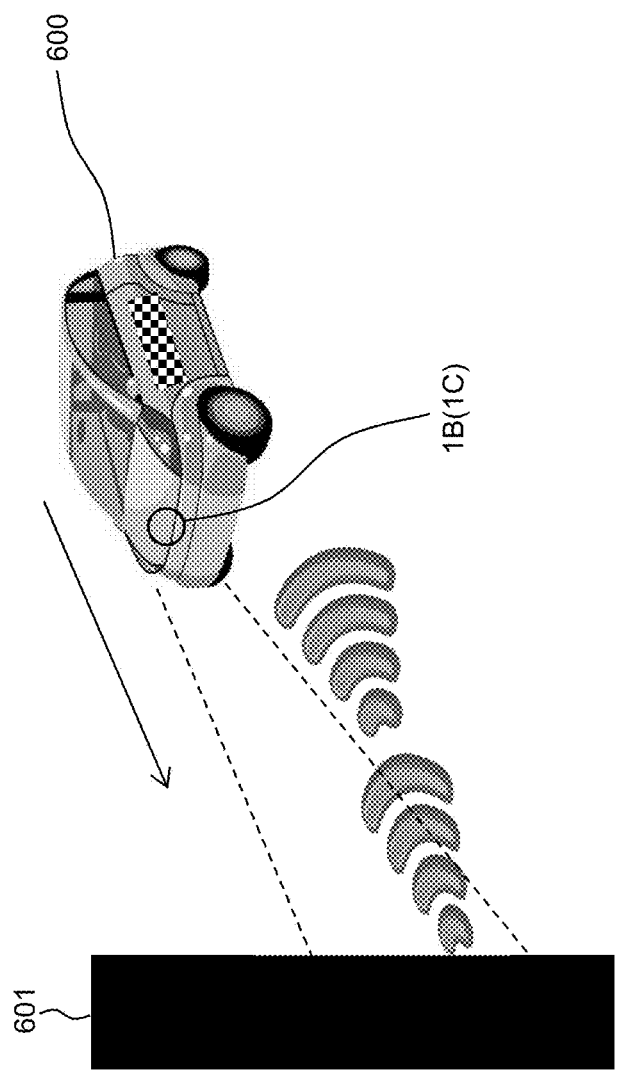
FIG. 29 is a diagram illustrating a case where distance is measured by using an LED lamp built in an automobile headlight.
Figure 30:
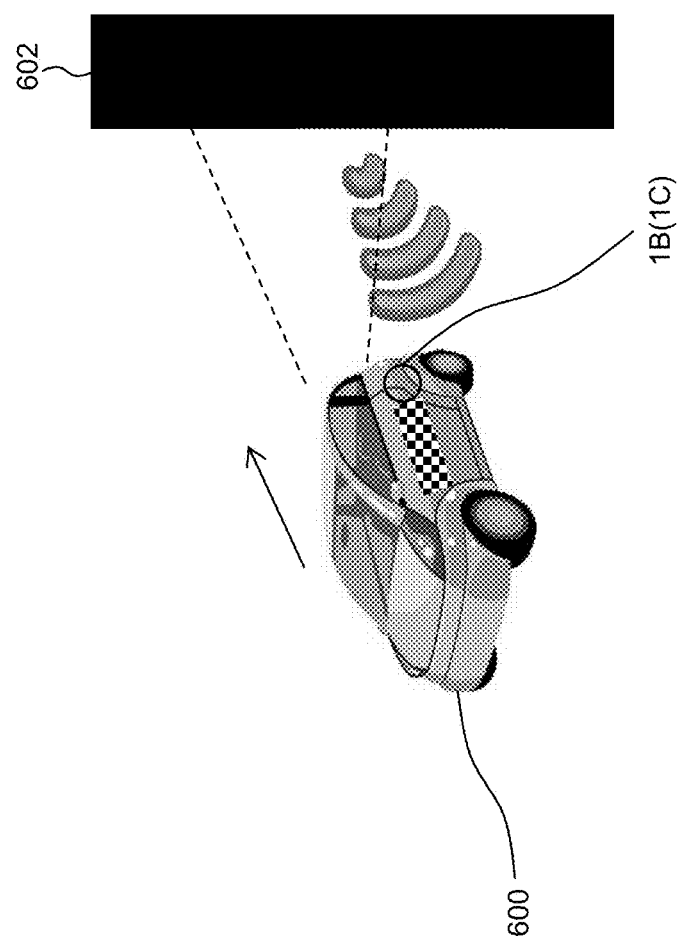
FIG. 30 is a diagram illustrating a case where distance is measured by using an LED lamp built in an automobile taillight.

The data processing device 502 inputs the received information, which is output from the photodetector 501, and computes the time interval between the instant at which the LED lamp 1B irradiates light to convey the specific information and the instant at which the resulting reflected light is received by the visible light sensor 510. For example, the distance to an obstacle in front of the irradiation direction or the time required for reaching the obstacle can be determined in accordance with the computed time interval. If, for instance, the LED lamp 1B is incorporated into a headlight of an automobile 600 as illustrated in FIG. 29, the light reflected from an obstacle 601 in front of the automobile 600 is detected. If the LED lamp 1B is incorporated into a taillight of the automobile 600 as illustrated in FIG. 30, the light reflected from an obstacle 602 behind the automobile 600 is detected. If, for instance, code data shown in FIG. 31 is used as the specific information, an arrival delay time of a received code with respect to a transmitted code (a time lag) is computed. The distance to the obstacle can be computed from the time lag and the current running speed of the automobile.

The data processing device 502 is built, for instance, in a vehicle-mounted electronic controller (ECL). If collision avoidance is to be provided, for example, by brake control and engine control, the data processing device 502 is built in a brake control ECL and in an engine control ECL. When the distance to an obstacle or the time required for reaching the obstacle is shorter than a permissible limit, a forcible intervention takes place to apply the brake with an appropriate strength or cause an engine to shift down in accordance, for instance, with the distance and with the current running speed.

Hence, in a case where the LED lamp is used for a vehicle's headlight or taillight, for example, the distance to an obstacle in front of the irradiation direction is determined in accordance with the delay time required for the specific information, which is reflected from the front of the irradiation direction, to reach the visible light sensor. This will help avoid the collision of the vehicle.

Figure 28:
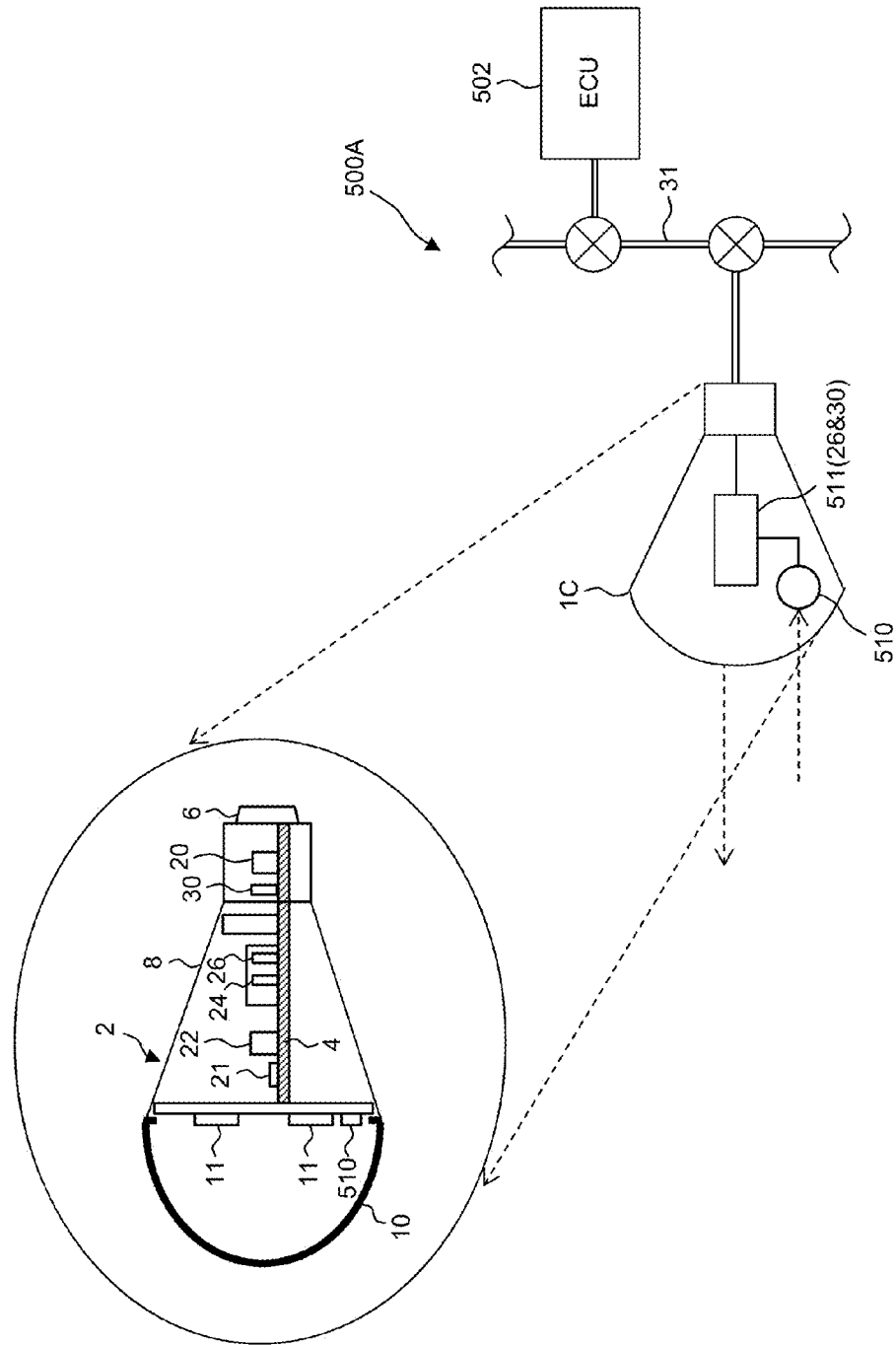
FIG. 28 is a block diagram illustrating a collision avoidance system that uses an LED lamp having the functions of a visible light sensor and of a communication section.

FIG. 28 illustrates a collision avoidance system 500A that uses an LED lamp 1C having the functions of the visible light sensor 510 and of the communication section 511, which form the photodetector. For the LED lamp 1C, the power supply/communication module 4 described with reference to FIG. 6 may be used. In this instance, the second visible light communication section 26 and the power-line communication section 30 implement the functions of the communication section 511. The second visible light communication section 26 inputs a signal from the visible light sensor 510 to provide control over visible light communication in a receiving direction. The power-line communication section 30 establishes the power-line communication to acquire the specific information to be stored in the nonvolatile storage device 24. The first visible light communication section 22 uses visible light to transmit the specific information read from the nonvolatile storage device 24. The power-line communication section 30 uses visible light to receive information under control of the second communication section 26, and transmits the received information to the outside through the power line 31. The data processing device 502 inputs the received information, which is output from the power-line communication section 30, and computes the distance to an obstacle in front of the irradiation direction in accordance with the time lag between the instant at which the LED lamp 1B irradiates light to convey the specific information and the instant at which the resulting reflected light is received by the visible light sensor 510. This provides the same advantageous effect as described with reference to FIG. 27 without providing the photodetector 501 described in the thirtieth aspect as an external circuit.

The present invention is not limited to the above-described embodiment. It will be obvious to those skilled in the art that various modifications can be made without departing from the spirit of the present invention.

For example, the nonvolatile storage device 24 is not limited to an on-chip flash memory of the microcomputer 82 in the power-line communication section 23. The nonvolatile storage device 24 may be a flash memory included in an LSI other than the microcomputer. Further, the nonvolatile storage device 24 need not always be a flash memory, but may be a nonvolatile memory having a different storage format such as a magnetoresistive random access memory (MRAM) or a ferroelectric random access memory (FRAM). The location information storage area of the nonvolatile storage device is not always accessed by the power-line communication section, but may be accessed by the first visible light communication section or by another program processing circuit or another logic circuit.

As a visible light communication section, the LED lamp may include only the first visible light communication section or both the first and second visible light communication sections. If the second visible light communication section is used for motion detection, the motion receiver is not required.

The server device may be formed of a personal computer or a workstation.

The LED lamp is not limited to a ceiling-mounted, or wall-mounted indoor lighting device, but may be, for example, an advertising lamp, a signboard backlight, or an outdoor lighting device for a street or a park.

An LED may be incorporated into a backup lamp instead of a taillight and used for collision avoidance.

What is claimed is:

1. An optical collision avoidance system comprising:
an LED lamp comprising:
a housing having a base coupled to a power line;
a lighting LED that is housed in the housing; and
a power supply/communication module that is housed in the housing, provided for the lighting LED, and configured to receive power supply from the power line;
wherein the power supply/communication module includes:
a power supply circuit that generates internal power supply by using the power supply supplied from the power line;
an LED drive circuit that supplies a drive voltage to the lighting LED by using the internal power supply generated by the power supply circuit;
a first communication section that provides control over visible light communication in a transmitting direction through the LED drive circuit;
a power-line communication section that establishes power-line communication through the power line; and
a nonvolatile storage device having a specific information storage area that stores specific information,
wherein the power-line communication section establishes the power-line communication to acquire the specific information to be stored in the specific information storage area, and
wherein the first communication section uses visible light to transmit, at a predetermined timing, the specific information read from the specific information storage area;
a photodetector that receives the light reflected from an object in an irradiation direction when the LED lamp irradiates light to convey the specific information; and
a data processing device that computes the time interval between the instant at which the LED lamp irradiates light to convey the specific information and the instant at which the resulting reflected light is received by the photodetector, and determines the distance to the object in the irradiation direction or the time required for reaching the object in accordance with the computed time interval.

2. An optical collision avoidance system comprising:
a vehicle-mounted LED lamp;
a vehicle-mounted power line; and
a vehicle-mounted data processing device,
wherein the LED lamp includes:
a housing having a base coupled to the power line;
a lighting LED that is housed in the housing; and
a power supply/communication module that is housed in the housing, provided for the lighting LED, and configured to receive power supply from the power line,
wherein the power supply/communication module includes:
a power supply circuit that generates internal power supply by using the power supply supplied from the power line;
an LED drive circuit that supplies a drive voltage to the lighting LED by using the internal power supply generated by the power supply circuit;
a first communication section that provides control over visible light communication in a transmitting direction through the LED drive circuit;

a power-line communication section that establishes power-line communication through the power line;
a nonvolatile storage device;
a visible light sensor; and
a second communication section that inputs a signal from the visible light sensor and provides control over visible light communication in a receiving direction,
wherein the power-line communication section establishes the power-line communication to acquire specific information to be stored in the nonvolatile storage device,
wherein the first communication section uses visible light to transmit the specific information read from the nonvolatile storage device, and the visible light sensor receives light reflected from an object in an irradiation direction when the LED lamp irradiates visible light to convey the specific information;
wherein the power-line communication section uses visible light to receive information under control of the second communication section and transmits the received information to the outside through the power line, and
wherein the data processing device inputs the received information, which is output from the power-line communication section, and computes the time interval between the instant at which the LED lamp irradiates light to convey the specific information and the instant at which the resulting reflected light is received by the visible light sensor, and determines the distance to the object in the irradiation direction or the time required for reaching the object in accordance with the computed time interval.

* * * * *